(12) United States Patent
O'Donovan et al.

(10) Patent No.: US 12,211,132 B2
(45) Date of Patent: *Jan. 28, 2025

(54) MODIFYING A GRAPHIC DESIGN TO MATCH THE STYLE OF AN INPUT DESIGN

(71) Applicant: Adobe Inc., San Jose, CA (US)

(72) Inventors: Peter O'Donovan, Seattle, WA (US);
Adam Portilla, Seattle, WA (US);
Satish Shankar, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,015

(22) Filed: Sep. 11, 2023

(65) Prior Publication Data
US 2023/0419576 A1    Dec. 28, 2023

Related U.S. Application Data

(63) Continuation of application No. 14/942,503, filed on Nov. 16, 2015, now Pat. No. 11,756,246.
(Continued)

(51) Int. Cl.
*G06T 11/60*     (2006.01)
*G06F 3/0484*    (2022.01)
(Continued)

(52) U.S. Cl.
CPC ............ *G06T 11/60* (2013.01); *G06F 3/0484* (2013.01); *G06F 3/04842* (2013.01);
(Continued)

(58) Field of Classification Search
CPC ................... G06T 11/60; G06T 11/001; G06T 2207/10016; G06T 2207/10024; G06F 3/0484; G06F 3/04842; G06F 3/0488; G06F 18/22; G06F 18/24133; G06F 40/103; G06N 7/01; G06V 10/761; G06V 30/19173; G06V 30/414; G06V 40/16; G11B 27/031

See application file for complete search history.

(56) References Cited

U.S. PATENT DOCUMENTS 5,860,073 A    1/1999   Ferrel et al.
6,298,157 B1  10/2001   Wilensky
(Continued)

OTHER PUBLICATIONS

U.S. Appl. No. 14/937,577, filed Sep. 14, 2018, Preinterview 1st OA.
(Continued)

*Primary Examiner* — Motilewa Good-Johnson
(74) *Attorney, Agent, or Firm* — Keller Preece PLLC

(57) ABSTRACT

The present disclosure is directed toward systems and methods for retargeting a user's input digital design based on a selected template digital design. For example, in response to the user's selection of a template digital design, one or more embodiments described herein change various design features of the user's input digital design to match corresponding design features in the selected template digital design. One or more embodiments described herein also provide template digital designs to the user for use in retargeting after a two-step selection process that ensures the provided template digital designs are compatible with the user's input digital design.

20 Claims, 15 Drawing Sheets

Related U.S. Application Data

(60) Provisional application No. 62/198,537, filed on Jul. 29, 2015.

(51) Int. Cl.

| | | |
|---|---|---|
| *G06F 3/04842* | (2022.01) | |
| *G06F 3/0488* | (2022.01) | |
| *G06F 18/22* | (2023.01) | |
| *G06F 18/2413* | (2023.01) | |
| *G06F 40/103* | (2020.01) | |
| *G06N 7/01* | (2023.01) | |
| *G06T 11/00* | (2006.01) | |
| *G06V 10/74* | (2022.01) | |
| *G06V 30/19* | (2022.01) | |
| *G06V 30/414* | (2022.01) | |
| *G06V 40/16* | (2022.01) | |
| *G11B 27/031* | (2006.01) | |

(52) U.S. Cl.
CPC ............ *G06F 3/0488* (2013.01); *G06F 18/22* (2023.01); *G06F 18/24133* (2023.01); *G06F 40/103* (2020.01); *G06N 7/01* (2023.01); *G06T 11/001* (2013.01); *G06V 10/761* (2022.01); *G06V 30/19173* (2022.01); *G06V 30/414* (2022.01); *G06V 40/16* (2022.01); *G11B 27/031* (2013.01); *G06T 2207/10016* (2013.01); *G06T 2207/10024* (2013.01)

(56) References Cited

U.S. PATENT DOCUMENTS

| | | | |
|---|---|---|---|
| 6,809,741 | B1 | 10/2004 | Bates et al. |
| 7,308,418 | B2 | 12/2007 | Malek et al. |
| 8,041,111 | B1 | 10/2011 | Wilensky |
| 8,416,255 | B1 | 4/2013 | Gilra |
| 8,429,524 | B2 | 4/2013 | Balinsky et al. |
| 8,849,043 | B2 | 9/2014 | Ptucha et al. |
| 8,849,853 | B2 | 9/2014 | Ptucha et al. |
| 8,872,969 | B1 | 10/2014 | Rathi et al. |
| 9,110,977 | B1 | 8/2015 | Pierre et al. |
| 9,342,498 | B2 | 5/2016 | McNaught |
| 9,639,969 | B1 | 5/2017 | Wilson et al. |
| 10,049,477 | B1 | 8/2018 | Kokemohr et al. |
| 10,068,179 | B2 * | 9/2018 | O'Donovan ...... G06F 18/24133 |
| 10,176,430 | B2 * | 1/2019 | Shankar ............. G06N 7/01 |
| 10,311,366 | B2 | 6/2019 | Portilla et al. |
| 11,756,246 | B2 * | 9/2023 | O'Donovan .......... G06T 11/001 345/634 |
| 2001/0054050 | A1 | 12/2001 | Weil et al. |
| 2002/0110372 | A1 | 8/2002 | Fields |
| 2003/0063130 | A1 | 4/2003 | Barbieri et al. |
| 2004/0046802 | A1 | 3/2004 | Wright et al. |
| 2004/0196298 | A1 | 10/2004 | Nagahashi et al. |
| 2005/0195331 | A1 | 9/2005 | Sugano et al. |
| 2005/0268227 | A1 | 12/2005 | Carlson et al. |
| 2008/0149713 | A1 | 6/2008 | Brundage |
| 2009/0016605 | A1 | 1/2009 | Chao et al. |
| 2009/0309894 | A1 | 12/2009 | Lam et al. |
| 2010/0199168 | A1 | 8/2010 | Balinsky et al. |
| 2010/0223581 | A1 | 9/2010 | Manolescu et al. |
| 2010/0318899 | A1 | 12/2010 | Kitada |
| 2011/0026835 | A1 | 2/2011 | Ptucha et al. |
| 2011/0157226 | A1 | 6/2011 | Ptucha et al. |
| 2011/0234615 | A1 | 9/2011 | Hanson et al. |
| 2011/0261994 | A1 | 10/2011 | Cok |
| 2011/0261995 | A1 | 10/2011 | Cok |
| 2011/0273474 | A1 | 11/2011 | Iwayama |
| 2013/0111324 | A1 | 5/2013 | Kern et al. |
| 2013/0198617 | A1 | 8/2013 | Maloney et al. |
| 2013/0315477 | A1 | 11/2013 | Murray et al. |
| 2014/0037200 | A1 | 2/2014 | Phillips et al. |
| 2014/0055803 | A1 | 2/2014 | Uhlig et al. |
| 2014/0173397 | A1 | 6/2014 | Pereira et al. |
| 2014/0195921 | A1 | 7/2014 | Grosz et al. |
| 2014/0201623 | A1 | 7/2014 | Kattner et al. |
| 2014/0258101 | A1 | 9/2014 | Svendsen et al. |
| 2014/0359656 | A1 | 12/2014 | Banica et al. |
| 2015/0002696 | A1 | 1/2015 | He et al. |
| 2015/0213001 | A1 | 7/2015 | Levy et al. |
| 2015/0256568 | A1 | 9/2015 | Osmond et al. |
| 2015/0379000 | A1 | 12/2015 | Haitani et al. |
| 2016/0092402 | A1 | 3/2016 | Martin |
| 2016/0093080 | A1 | 3/2016 | Tumanov et al. |
| 2016/0104453 | A1 | 4/2016 | Borenstein et al. |
| 2016/0142625 | A1 | 5/2016 | Weksler et al. |
| 2016/0148343 | A1 | 5/2016 | Yan et al. |
| 2016/0275067 | A1 * | 9/2016 | Mei ..................... G06F 40/106 |
| 2017/0032554 | A1 | 2/2017 | O'Donovan et al. |
| 2017/0357913 | A1 | 12/2017 | Garrison et al. |
| 2019/0087742 | A1 * | 3/2019 | Shankar ............... G06V 10/761 |

OTHER PUBLICATIONS

U.S. Appl. No. 14/937,577, filed Nov. 5, 2018, Office Action.
U.S. Appl. No. 14/937,577, filed Feb. 4, 2019, Notice of Allowance.
U.S. Appl. No. 14/937,619, filed Feb. 16, 2017, Preinterview 1st OA.
U.S. Appl. No. 14/937,619, filed Mar. 31, 2017, Office Action.
U.S. Appl. No. 14/937,619, filed Sep. 8, 2017, Office Action.
U.S. Appl. No. 14/937,619, filed Feb. 7, 2018, Notice of Allowance.
U.S. Appl. No. 14/942,503, filed Oct. 4, 2016, Preinterview 1st OA.
U.S. Appl. No. 14/942,503, filed Jan. 23, 2017, 1st Action Interview OA Summary.
U.S. Appl. No. 14/942,503, filed May 31, 2017, Office Action.
U.S. Appl. No. 14/942,503, filed Feb. 20, 2018, Office Action.
U.S. Appl. No. 14/942,503, filed Sep. 7, 2018, Office Action.
U.S. Appl. No. 14/942,503, filed Apr. 16, 2019, Office Action.
U.S. Appl. No. 14/942,503, filed Dec. 16, 2019, Office Action.
U.S. Appl. No. 14/942,503, filed Aug. 27, 2020, Office Action.
U.S. Appl. No. 14/942,503, filed Apr. 24, 2023, Notice of Allowance.
U.S. Appl. No. 14/947,683, filed Jun. 28, 2017, Preinterview 1st OA.
U.S. Appl. No. 14/947,683, filed Sep. 26, 2017, Office Action.
U.S. Appl. No. 14/947,683, filed Jan. 22, 2018, Office Action.
U.S. Appl. No. 14/947,683, filed Aug. 9, 2018, Office Action.
U.S. Appl. No. 14/947,683, filed Nov. 2, 2018, Notice of Allowance.
U.S. Appl. No. 16/193,933, filed Sep. 2, 2020, Preinterview 1st OA.
U.S. Appl. No. 16/193,933, filed Jan. 28, 2021, Office Action.
U.S. Appl. No. 16/193,933, filed Mar. 23, 2021, Office Action.
U.S. Appl. No. 16/193,933, filed Jul. 23, 2021, Notice of Allowance.

* cited by examiner

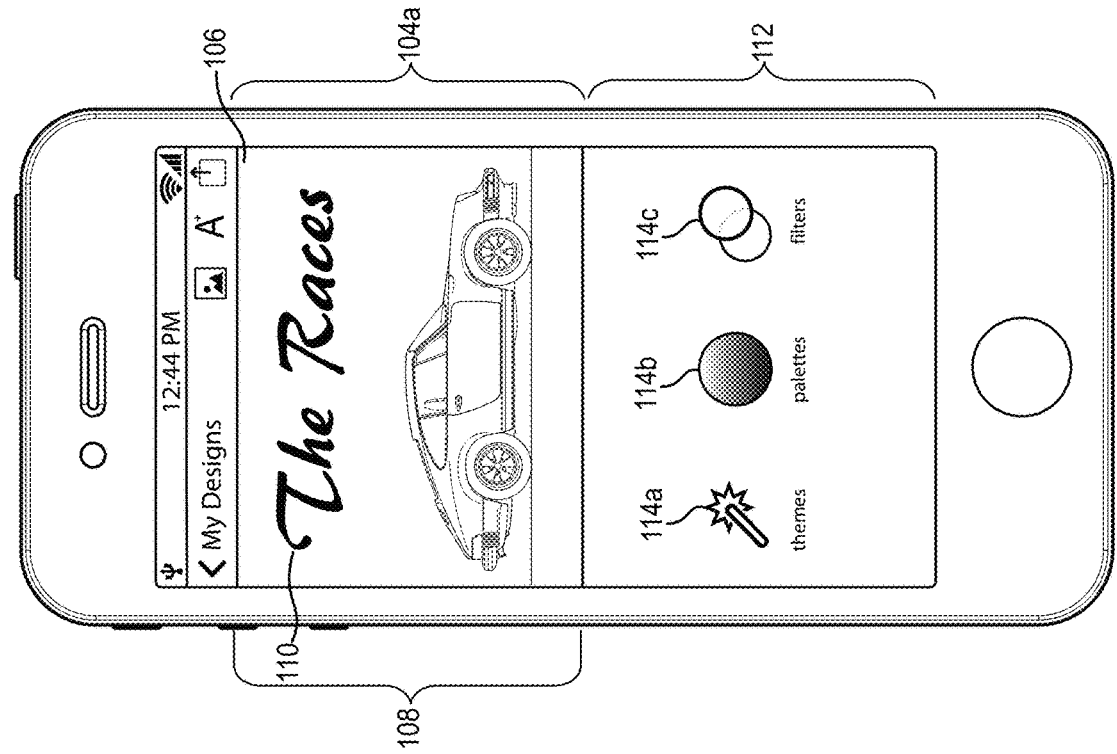
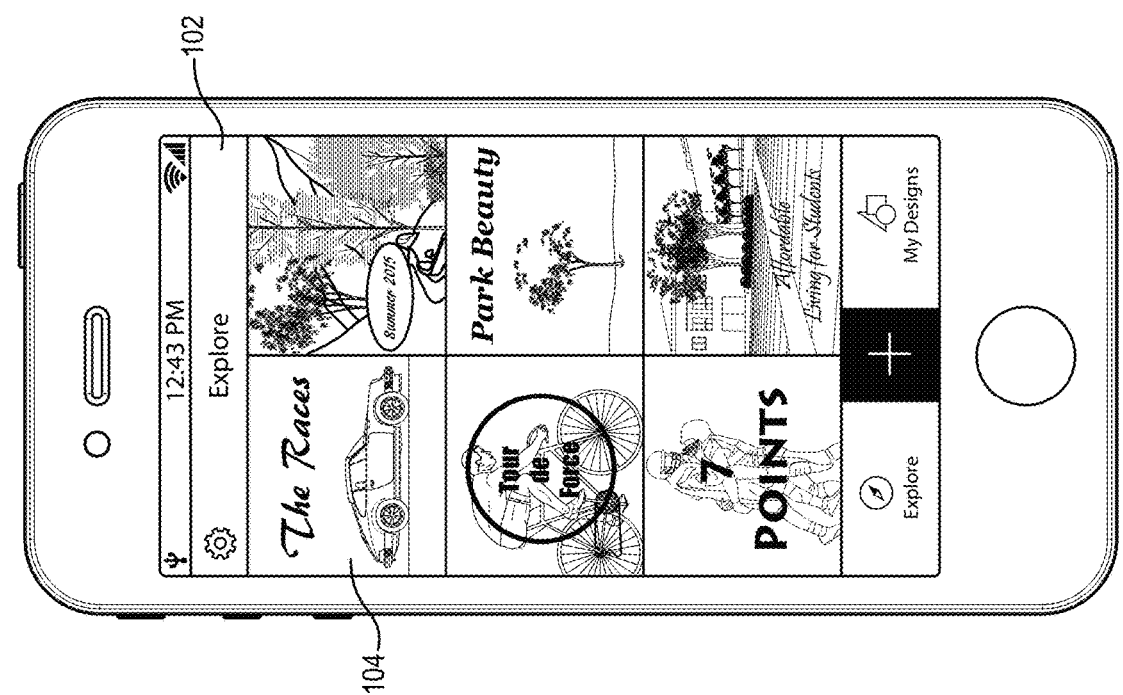
Fig. 1A
Fig. 1B

Many to One Correspondence

Retargeted Digital Design

Selected Template

User's Digital Design

MODIFYING A GRAPHIC DESIGN TO MATCH THE STYLE OF AN INPUT DESIGN

CROSS REFERENCE TO RELATED APPLICATIONS

This application is a continuation of U.S. patent application Ser. No. 14/942,503, filed on Nov. 16, 2015, which claims the benefit of and priority to U.S. Provisional Patent Application No. 62/198,537, filed Jul. 29, 2015. Each of the aforementioned applications is hereby incorporated by reference in its entirety.

BACKGROUND

1. Technical Field

One or more embodiments of the present disclosure relate generally to digital media. More specifically, one or more embodiments of the present disclosure relate to creating or editing digital media digital media.

2. Background and Relevant Art

Users generally spend many hours online every day. For example, a user may read social media posts and news articles online, purchase goods through retail websites online, compose emails and blog posts online, plan vacations online, perform work tasks online, and so forth. It is not surprising that, in light of how much time users spend online, providers of web content typically put great effort into creating web content that quickly draws user's attention. For instance, a marketer may put a lot of time and work into designing an advertisement campaign that is professional and eye-catching and that will cause online users to become interested in the campaign.

Thus, it is important for a content provider to draw online user's attention in order to entice online users into clicking a hyperlink, viewing an advertisement, providing a response, purchasing a good, etc. Problems arise, however, for many content providers who are not trained or experienced in creating professional and eye-catching digital media. For example, a content provider may wish to design a digital image that has the same "look and feel" as an existing image, but does not have the design experience to do so. Accordingly, the content provider may attempt a trial-and-error process of changing various elements within the digital image in an attempt to replicate an existing design. This process, however, is frustrating to the untrained and wastes times.

Furthermore, while various types of software exist that facilitate a user editing digital media, these software packages are generally bulky and require a substantial amount of processing power and memory from the computing device on which the software is running. Thus, in order to successfully edit digital images, a user generally utilizes a larger computing device, such as a laptop or desktop computer. Additionally, digital editing software run on a larger computer device typically allows the use of additional peripherals, such as a keyboard, a computer mouse, a stylus, etc. Accordingly, conventional system provide users little recourse when faced with a need or desire to create or edit digital images "on-the-go" utilizing a handheld device (e.g., a smart phone, tablet, smart wearable) using only an associated touch screen.

Thus, there are several disadvantages to current methods for creating and editing digital media.

SUMMARY

One or more embodiments described herein provide benefits and/or solve one or more of the foregoing or other problems in the art with systems and methods that provide users with efficient and effective user experiences in creating and editing digital media. For example, one or more embodiments include systems and methods that filter and present a group of template digital design to a user that have been scored based on a compatibility between each template digital design and the user's input digital design. In response to the user selecting one of the presented template digital designs, systems and methods described herein alter the user's input digital design to match the look-and-feel of the selected template digital design. Accordingly, the user can produce eye-catching and aesthetically pleasing designs without any hassle or wasted time.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIGS. 1A-1E illustrate a series of graphical user interfaces in connection with the digital content creation/editing system that illustrate retargeting a input digital design based on a selected template digital design;

DETAILED DESCRIPTION

Figure 1D:
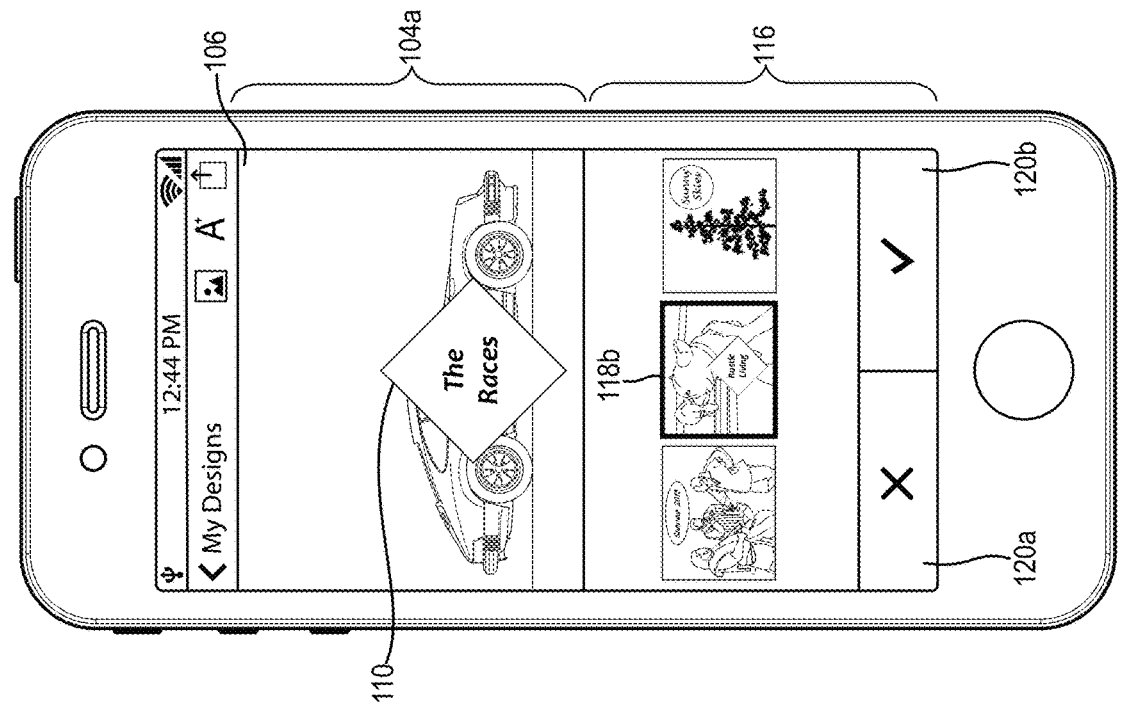

One or more embodiments described herein include a digital content creation/editing system that enables a user to easily create professional and aesthetically pleasing digital media on a handheld device. Specifically, the digital content creation/editing system matches the look and feel of an input digital design to that of a template digital design. To illustrate, in response to a user's selection of a particular template digital design, the digital content creation/editing system identifies various design features of both the input digital design and the particular template digital design. The digital content creation/editing system then changes the design features that correspond between the input digital design and the particular template digital design such that the corresponding design features in the input digital design match those of the particular template digital design. Thus, the input digital design takes on the look and feel of the particular template digital design.

Prior to matching the look and feel of a template digital design in an input digital design, the digital content creation/editing system performs a selection process in order to present the user with the most compatible template digital designs for use in connection with an input digital design. In one or more embodiments, the selection process begins with an initial filtering of a large body of template digital designs to identify a sub-group of template digital designs that satisfy a base level of compatibility with the input digital design. Thus, in one or more embodiments, the digital content creation/editing system only presents template digital designs for selection that are have a threshold compatibility with the user's input digital design.

Next, the digital content creation/editing system scores the sub-group of template digital designs in order to present a ranked listing of the sub-group of template digital designs to the user. In one or more embodiments, the digital content creation/editing system ranks a template digital design from the sub-group of template digital designs based on corresponding design features identified between the user's input digital design and the template digital design. To illustrate, in at least one embodiment, the digital content creation/editing system identifies one or more textual design features (e.g., number of text blocks, text lengths, text groupings, etc.) in both the input digital design and the template digital design from the sub-group of template digital designs. The digital content creation/editing system then calculates a compatibility score for the template digital design based on a correlation between the identified textual design features in the input digital design and the identified textual design features in the template digital design. Accordingly, the scoring system utilized by the digital content creation/editing system generally assigns high scores to template digital designs that are strongly correlated with the user's input digital design.

Once the digital content creation/editing system has calculated a compatibility score for each of the sub-group of template digital designs, the digital content creation/editing system then ranks the template digital designs based on their calculated scores. In one or more embodiments, the digital content creation/editing presents the sub-group of template digital designs to the user based on the determined rankings. Thus, the user is more likely to select a well-ranked template digital design from the sub-group of template digital designs. In response to the user's selection, the digital content creation/editing system alters one or more design features of the user's input digital design to match one or more correlated design features of the selected template digital design.

As used herein, an "input digital design" refers to any type of digital media or multimedia image. For example, an input digital design includes, but is not limited to, digital photographs, digital video, computer generated imagery, "GIF s," "JPEGs," "PDFs," etc. In one or more embodiments, an input digital design is any type of computer readable data representing a design that is capable of being digital edited. Generally, an input digital design includes an underlying image and an overlay. In particular, specific examples of input digital designs include a digital magazine page, a digital advertisement, a webpage, a digital logo, etc.

As used herein, an "underlying image" refers to an image that serves as the background of an input digital design. For example, an underlying image associated with an input digital design includes any variation of shapes, colors, people, landmarks, interiors, exteriors, and so forth. The underlying image associated with an input digital design is generally taken from an input file (e.g., a JPEG file, GIF file, a PNG file, a PDF file, a raw digital photograph file, etc.). Other examples of an underlying image are animations, illustrations, or other digital content. Still another example of an underlying image is a frame of a video.

As used herein, an "overlay" refers to an image that serves as the foreground of an input digital design. For example, one type of overlay is a textual overlay. A textual overlay includes text, and in some cases, a backing shape or border. An overlay can have variable opacity such that, when in combination with an underlying image, part of the underlying image is viewable through the overlay. Together, the underlying image and the overlay serve to create a rich input digital design wherein the content of the overlay is highlighted by the content of the underlying image.

As used herein, a "template digital design" is an existing input digital design with one or more design features that can be mirrored in another input digital design. For example, in one or more embodiments, a template digital design includes an overlay and an underlying image. The digital content creation/editing system can identify various design features associated with the overlay of the template digital design (e.g., text blocks, text size, backing shape type), and can change corresponding design features in another input digital design to match the identified design features from the overlay of the template digital design. In at least one embodiment, the digital content creation/editing system stores a library of template digital designs. Alternatively, the digital content creation/editing system can perform web lookups to identify one or more template digital designs.

As used herein, a "compatibility score" refers to a measure of how compatible a particular template digital design is with another input digital design. In one or more embodiments, the digital content creation/editing system calculates a compatibility score for a template digital design by identifying correlating design features between the template digital design and the input digital design. Thus, the compatibility scores the digital content creation/editing system calculates for a group of template digital designs are specific to a single input digital design.

Also as used herein, a "design element" refers to any design element included in an input digital design or a template digital design. For example, a design element of an input digital design can be a block of text, an underlying image, an overlay, etc. Frequently, input digital designs and template digital design have many design elements in common.

Furthermore, as used herein, a "design feature" refers to an attribute of a design element. For example, the text block design element can be associated with design features including font, font size, text color, etc. As will be described in greater detail below, the digital content creation/editing system retargets both design elements and design features in an input digital design based on a selected template digital design.

In one or more embodiments, the digital content creation/editing system presents series of graphical user interfaces ("GUIs" or "user interfaces") that enable a user to edit and/or create digital images. The digital content creation/editing system provides the user interfaces on the display of a handheld device. As used herein, the term "handheld device" refers to a device sized and configured to be held in a single hand of a user (e.g., a mobile phone or smart phone, a personal digital assistant, a tablet computer, a smart wearable). Alternatively, however, the digital content creation/editing system can present graphical user interfaces on any other suitable computing device such as, but not limited to, a larger wireless device, a laptop or desktop computer, and/or any other suitable computing device.

The process by which the digital content creation/editing system automatically modifies an input digital design to match one or more design features of a template digital design will now be described with reference to a series of user interface in FIGS. 1A-1E. It will be understood that the digital content creation/editing system displays the user interfaces illustrated in FIGS. 1A-1E on the touch screen of a client-computing device such as a smart phone, tablet, smart wearable, etc. Furthermore, FIGS. 1A-1E and the related description reference creation and modification of input digital designs comprising an underlying image and an overlay. One will appreciate that in alternative embodiments, the input digital designs can comprise videos, animations, illustrations, or other digital content in addition to, or in place of, a digital image. Thus, the reference to a digital image below is to aid in explaining the various embodiments and should not be considered limiting.

For example, as shown in FIG. 1A, a user begins the process of creating an input digital design by selecting an input digital design 104 from the image gallery GUI 102. In one or more embodiments, the image gallery GUI 102 includes a variety of existing designs or images (e.g., provided by the digital content creation/editing system, provided by a community of users of the digital content creation/editing system, or previous designs/images stored by the user) that the user can select for editing in order to creation a new input digital design. Each of the existing designs generally includes a combination of images and text, as well as other style elements (e.g., underlying images, overlays, etc.). As will be further described below, in alternative or additional embodiments, rather than selecting an existing design to edit, the user can create a new design that is not based on any existing image or previous design.

In response to presentation of a input digital design 104, whether selected from the image gallery or newly created as shown in FIG. 1A, the digital content creation/editing system provides an editable input digital design 104a in an editing GUI 106, as shown in FIG. 1B. Because the existing input digital designs shown in the image gallery GUI 102 are available to all users of the digital content creation/editing system, in at least one embodiment, the digital content creation/editing system copies a selected existing input digital design in order to make the selected input digital design available for editing. Thus, the digital content creation/editing system creates an input digital design that is a copy of the selected existing input digital design so that a user can edit the copy of the existing input digital design, rather than editing the original existing input digital design.

For example, as shown in FIG. 1B, the digital content creation/editing system provides the editable input digital design 104a within the editing GUI 106. As discussed above, the editable input digital design 104a includes an underlying image 108 (e.g., a picture of a car) that serves as a background for an overlay 110 (e.g., the text "The Races"). As shown in FIG. 1B, the overlay 110 includes only opaque text with no backing shape or border. In alternative embodiments, the overlay 110 may be more transparent so as to allow a portion of the underlying image 108 behind the overlay 110 to be viewed. Additionally, in alternative embodiments, the overlay 110 may include a backing shape and/or a border.

As further shown in FIG. 1B, the editing GUI 106 also includes an editing control palette 112 with one or more editing controls 114a-114c that enable the user to edit various elements associated with the editable input digital design 104a. For example, in response to the user selecting the editing control 114a, the digital content creation/editing system provides the user with various template digital designs that can be applied to the editable input digital design 104a. In response to the user selecting the editing control 114b, the digital content creation/editing system provides the user with various color palettes that can be applied to the editable input digital design 104a. In response to the user selecting the editing control 114c, the digital content creation/editing system provides the user with various filters that can be applied to the editable input digital design 104a.

Figure 1C:
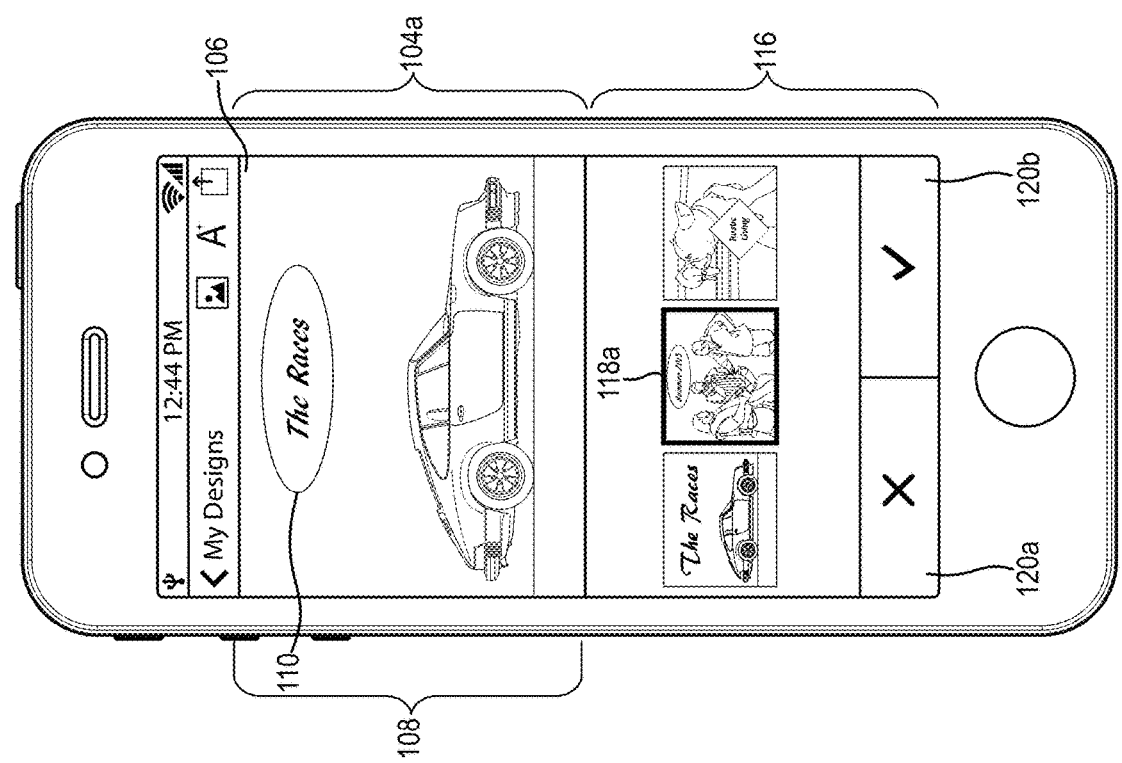

As mentioned above, the digital content creation/editing system mirrors the look and feel of a selected template digital design in an input digital design. This process will now be described with reference to FIGS. 1B-1E. In response to the user selecting the editing control 114a, as shown in FIG. 1B, the digital content creation/editing system replaces the editing control palette 112 with a template digital design selection control 116, as shown in FIG. 1C. In one or more embodiments, the template digital design selection control 116 includes one or more template digital designs 118a, 118b. The template digital design selection control 116 shown in FIG. 1C is a side-scrolling control that includes any number of template digital designs. In alternative embodiments, the template digital design selection control 116 can comprise a vertical-scrolling control, a drop-down menu, a grid of selection, or another GUI interface that allows for selection of a template digital design. The digital content creation/editing system provides the template digital designs 118a, 118b in the template digital design selection control 116 after a selection process as will be described below.

In response to the user selecting the template digital design 118a, the digital content creation/editing system mirrors the look-and-feel of the template digital design 118a in the editable input digital design 104a, as shown in FIG. 1C. For example, as illustrated in FIG. 1C, the digital content creation/editing system mirrors the look-and-feel of the template digital design 118a in the editable input digital design 104a by changing one or more design features (e.g., the overlay 110) of the editable input digital design 104a to match corresponding design features in the template digital design 118a. Accordingly, the digital content creation/editing system changes the font, text size, backing shape, and position of the overlay 110 to mirror the template digital design 118a. Although not illustrated in FIG. 1C, the digital content creation/editing system can change a color palette, filter, tone, etc. of the underlying image 108 of the editable input digital design 104a based on the template digital design 118a.

Figure 1E:
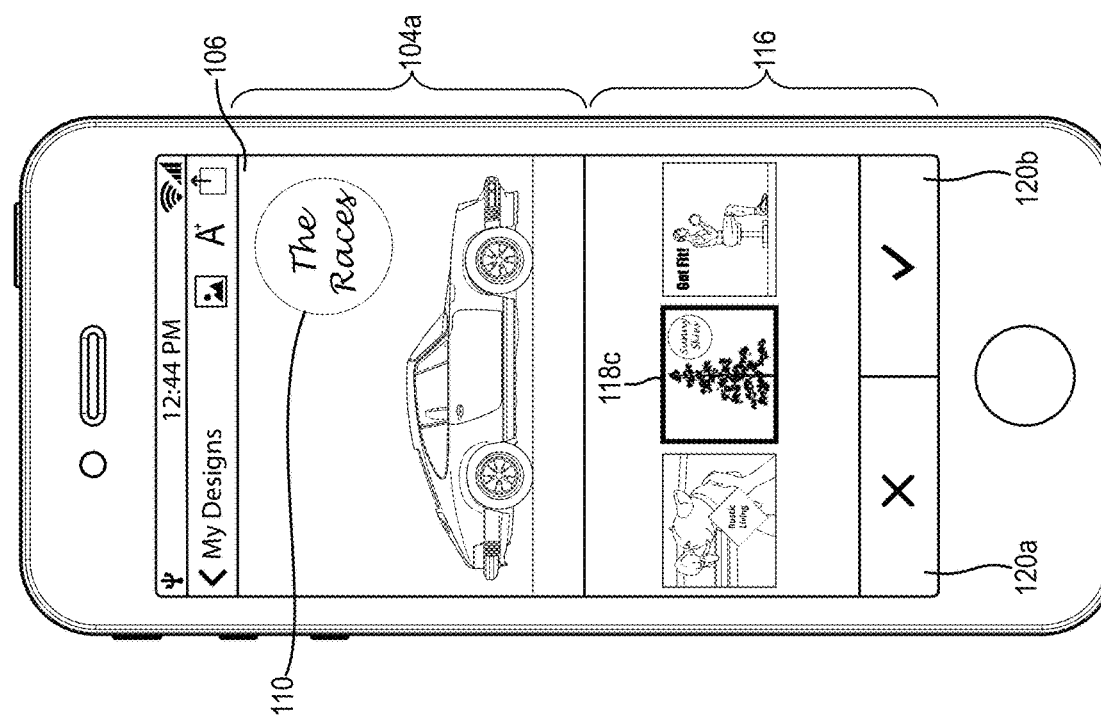

The digital content creation/editing system continues to change one or more design features of the editable input digital design 104a to match corresponding design features in the template digital designs 118b and 118c, as shown in FIGS. 1D and 1E, respectively. For example, as shown in FIG. 1D, in response to the user selecting the template digital design 118b from the template digital design selection control 116, the digital content creation/editing system changes the overlay 110 to include a different font, text size, backing shape, and position. Additionally, as shown in FIG. 1E, in response to the user selecting the template digital design 118c from the template digital design selection control 116, the digital content creation/editing system again changes the overlay 110 to include another font, text size, backing shape, and position. In one or more embodiments, the user can cancel any changes made to the editable input digital design 104a by selecting the cancel control 120a, or can save any changes made to the editable input digital design 104a by selecting the save control 120b.

As mentioned above, the digital content creation/editing system provides the template digital designs 118a-c in the template digital design selection control 116 as the result of a selection process. For example, the digital content creation/editing system has access to a wide variety of template digital designs (e.g., more than the user could effectively scroll through). Accordingly, in order to save the user time and hassle (and also to enable the template digital design selection control 116 to load quickly), the digital content creation/editing system utilizes a selection process to present only the most compatible template digital designs in the template digital design selection control 116.

The selection process begins when the digital content creation/editing system identifies one or more design features of an input digital design. In one or more embodiments, the digital content creation/editing system identifies and selects template digital designs to include in the template digital design selection control 116 based on the identified template digital design's compatibility with an input digital design. For example, as shown in FIG. 1C, the digital content creation/editing system selected the template digital designs 118a-c in the template digital design selection control 116 from a much larger collection of template digital designs based on the template digital design's 118a-c compatibility with the input digital design 104a. As the digital content creation/editing system bases compatibility on design features of both the input digital design and a particular template digital design, the digital content creation/editing system begins the template digital design selection process by identifying design features of the input digital design.

In at least one embodiment, the design features of an input digital design that the digital content creation/editing system is most concerned with are textual design features. For example, an input digital design may include multiple overlays, each with different types of text. To illustrate, the input digital design may include an overlay including a single block of large-sized text (e.g., a title), as well as another overlay include two blocks of smaller-sized text (e.g., a subtitle and an author's by-line). Accordingly, the digital content creation/editing system identifies the number of overlays, number of text blocks, text size, relative position of text blocks, and overlay placement as design features of the input digital design. In one or more embodiments, the digital content creation/editing system identifies additional design features of the input digital design, such as, but not limited to, color palettes associated with the underlying image of the input digital design, color palettes associated with the one or more overlays of the input digital design, backing shapes and/or borders associated with the one or more overlays of the input digital design, filters associated with the underlying image and/or overlay of the input digital design, empty spaces within the input digital design, shapes within the underlying images of the input digital design, overall tone of the input digital design, faces detected within the input digital design, metadata associated with the input digital design, etc.

Next, after identifying various design features associated with the input digital design, the digital content creation/editing system performs an initial filter of the collection of template digital designs stored by the digital content creation/editing system. For example, in order to save the user time and hassle, the digital content creation/editing system does not present all available template digital designs to the user via the template digital design selection control 116. Rather, the digital content creation/editing system performs a selection process to identify the template digital designs that are most compatible with the user's input digital design. Accordingly, after identifying various design features associated with the input digital design, the selection process continues with an initial filtering of the collection of template digital designs.

In one or more embodiments, the initial filtering is based on a subset of the input digital design's identified design features. Thus, the filtering process identifies of subset of the template digital designs with a threshold compatibility the input digital design. For example, in order to exempt the template digital designs in the larger collection that are completely or substantially incompatible with the input digital design, the digital content creation/editing system performs the initial filtering of the collection of template digital designs based on a limited number of key design elements or design features. The limited number of design elements or design features for the initial filtering can comprise one or more of a number of text blocks, the text size and/or length associated with each text block, and the relative location of each text block. In alternative embodiments, the limited number of design elements or design features for the initial filtering can comprise presence of a particular design element, a type or sentiment of an underlying image, presence or lack of presence of a particular object (like a face) in the underlying image, etc.

In at least one embodiment, the design elements/features for the initial filtering comprise the number of text blocks identified in the input digital design and the length associated with each text block identified in the input digital design. Thus, the digital content creation/editing system performs the initial filtering by identifying the number of text blocks, and their length in a particular template digital design from the collection of template digital designs. If these identified design features of the particular template digital design are within a threshold level of similarity with the identified number of text blocks and their length, the digital content creation/editing system passes the particular template digital design onto the next phase of the selection process. If the identified design features of the particular template digital design are not within a threshold level of similarity with the same identified design features of the input digital design, the digital content creation/editing system disregards the particular template digital design.

To illustrate, in one case, an input digital design includes a single text block. Accordingly, for a particular template digital design from the collection of template digital designs, the digital content creation/editing system will identify features of the particular template digital design including the number of text blocks and/length associated with each text block. If the particular digital design includes a single text block, the digital content creation/editing system will determine that the particular template digital design will pass into the next phase of the selection process. Furthermore, this determination will be even stronger if both the single text block in the input digital design and the single text block in the template digital design are the same relative length. If a particular template digital design has four or more blocks of text the initial filtering process may filter or remove such template digital design from consideration.

Once the digital content creation/editing system has completed the initial filtering of the collection of template digital designs to find the sub-group of template digital designs that are within a threshold level of similarity with the input digital design, the digital content creation/editing system continues the selection process by calculating a compatibility score for each of the sub-group of template digital designs relative to the input digital design. In one or more embodiments, the compatibility score indicates how well a particular template digital design can be applied, or retargeted, to an input digital design. Accordingly, in at least one embodiment, the digital content creation/editing system calculates the compatibility score for a particular template digital design by determining how similar the particular template digital design is to the input digital design. In at least one embodiment, the compatibility score is based primarily on a number of text blocks, and the length of those text blocks, but can also take other design features into account.

As mentioned above, the digital content creation/editing system identifies a variety of design features associated with the input digital design. In order to calculate a compatibility score for a particular template digital design, the digital content creation/editing system identifies the same design features in the particular template digital design and determines how similar the identified design features in the particular template digital design are to the corresponding design features in the input digital design. For example, in addition to identifying number of text blocks, text size, and relative text block location in the particular template digital design, the digital content creation/editing system also identifies design features including, but not limited to, color palettes associated with the particular template digital design, backing shapes and/or borders associated with the particular template digital design, filters associated with the particular template digital design, empty spaces within the particular template digital design, shapes within the underlying images of the particular template digital design, tone of the particular template digital design, faces detected in the particular template digital design, metadata associated with the particular template digital design, etc.

The digital content creation/editing system calculates a compatibility score for a particular template digital design by comparing corresponding design features identified in the input digital design and the particular template digital design. If corresponding design features between the particular template digital design and the input digital design are very similar, the digital content creation/editing system adds a larger value to the particular template digital design's compatibility score. If corresponding design features between the particular template digital design and the input digital design are not very similar, the digital content creation/editing system adds a smaller value to the particular template digital design's compatibility score. If the particular template digital design does not include a certain design feature that is present in the input digital design, the digital content creation/editing system adds nothing to the particular template digital design's compatibility score. The digital content creation/editing system continues adding to the particular template digital design's compatibility score for each identified design feature between the particular template digital design and the input digital design, until all identified design features have been accounted for.

In one or more embodiments, the compatibility score also takes into account an expanded or larger set of design elements and design features. For example, the compatibility score further accounts for average line height in text blocks between the input digital design and a particular template digital design. Additionally, the compatibility score account for relative locations of text blocks between the input digital design and the particular template digital design. To illustrate, if the input digital design includes a heading text block (e.g., a text block with larger text size) above a sub-heading text block (e.g., a text block with smaller text size), the digital content creation/editing system will give a higher compatibility score to a particular template digital design with two text blocks with similar relative locations as those in the input digital design.

Furthermore, the compatibility score takes into account various design principles. For example, if the input digital design and a particular template digital design both include a single text block, the digital content creation/editing system assign a higher compatibility score. The digital content creation/editing system can further determine that the single text block in the input digital design includes a very large number of words and the single text block in the particular template digital design includes a very small number of words. In response to this determination, the digital content creation/editing system will further determine that if the input digital design were retargeted based on the particular template digital design, the large number of words in the single text block in the input digital design will be compressed to the point that they will no longer be legible. The digital content creation/editing system will penalize the compatibility score based on this determination.

In one or more embodiments, after calculating a compatibility score for each template digital design filtered from the larger collection of template digital designs, the digital content creation/editing system ranks the template digital designs based on their calculated compatibility scores. For example, the digital content creation/editing system presents template digital designs in the template digital design selection control 116, as shown in FIGS. 1C-1E, based on the rank assigned to each template digital design. Thus, the user is more likely to select a highly ranked (e.g., a more compatible) template digital design to apply to the user's input digital design because the most highly ranked template digital designs are presented to the user earlier in the template digital design selection control 116. In one embodiment, the digital content creation/editing system presents fifteen template digital designs in the template digital design selection control 116 with the top ranked compatibility scores. Furthermore, in at least one embodiment, the digital content creation/editing system presents the top fifteen template digital designs in the template digital design selection control 116 in descending order based on compatibility score.

In response to the user selecting a particular scored, ranked template digital design from the template digital design selection control 116, the digital content creation/editing system applies the various design features of the template digital design to the user's input digital design. For example, in order to apply the various design features of the selected template digital design to the input digital design, the digital content creation/editing system modifies one or more design features of the input digital design to match the one or more corresponding design features of the selected template digital design. Thus, the digital content creation/editing system enables the user to apply the font, color, layout, filters, etc. of a selected template digital design to an input digital design. This process is sometimes referred to as "retargeting" the input digital design.

In some embodiments, the user may select a scored, ranked template digital design from the template digital design selection control 116 that includes design features that are not an exact match for the corresponding design features in the input digital design. For example, the user may select a template digital design that includes two overlays, while the user's input digital design includes three overlays. Accordingly, in one or more embodiments, the digital content creation/editing system utilizes various layout heuristics to handle scenarios where the there is no exact match in text block layouts between the input digital design and a selected template digital design such that text legibility, relative text size, and text location are maintained. As will be described in greater detail below, the digital content creation/editing system can group blocks of text, un-group blocks of text, reposition blocks of text, etc. as needed in the input digital design in order to best approximate the look and feel of the selected template digital design.

For example, in one embodiment, the selected template digital design and the input digital design include the same number and type of textual design features (e.g., number of overlays, number of text blocks, text sizes, relative placement of text blocks, etc.). In that case, the digital content creation/editing system directly applies the textual design features of the selected template digital design to the input digital design. To illustrate, as illustrated between FIGS. 1B and 1C, the text and overlay placement in the editable input digital design 104a in FIG. 1B is the same as the text and overlay placement in the template digital design 118a in FIG. 1C. Accordingly, in response to the user selecting the template digital design 118a, the digital content creation/editing system directly applies the textual design features of the template digital design 118a to the input digital design 104a, as shown in FIG. 1C.

Figure 2A:
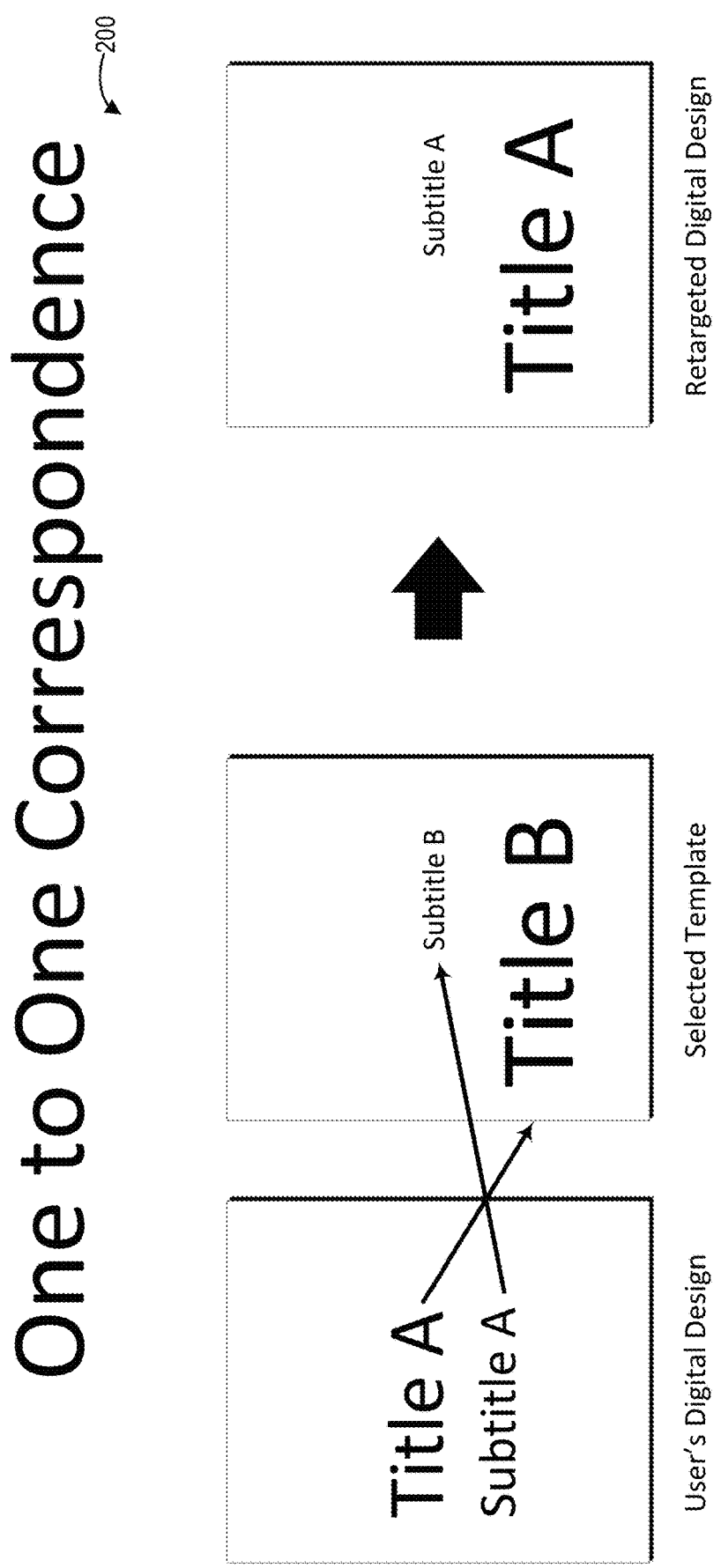
FIGS. 2A-2E illustrate a series of flowcharts of layout heuristics in connection with the digital content creation/editing system.

In another embodiment, there may be a one-to-one correspondence between the number of text blocks in the template digital design and the input digital design, although the placement of those text blocks varies between the template digital design and the input digital design. For example, as illustrated in the flow chart 200 presented in FIG. 2A, there is a one-to-one correspondence between the number of text blocks in the user's input digital design and the selected template digital design because both have one block of larger sized text (e.g., "Title A" and "Title B") and one block of smaller sized text (e.g., "Subtitle A" and "Subtitle B"). As shown, the placement of the text blocks, however, is not the same between the user's input digital design and the selected template digital design. Accordingly, as shown in FIG. 2A and in response to the user selecting the selected template digital design, the digital content creation/editing system applies the text block placement design features of the selected template digital design to the user's input digital design to achieve the retargeted input digital design. In other words, when there is a one-to-one correspondence between design elements of an input digital design and a selected template digital design, the digital content creation/editing system will directly copy corresponding design features (e.g., font, text color, image filters applied to the underlying image, etc.) from the selected template digital design to the input digital design.

Figure 2B:
Figure 2B:
Figure 2B:
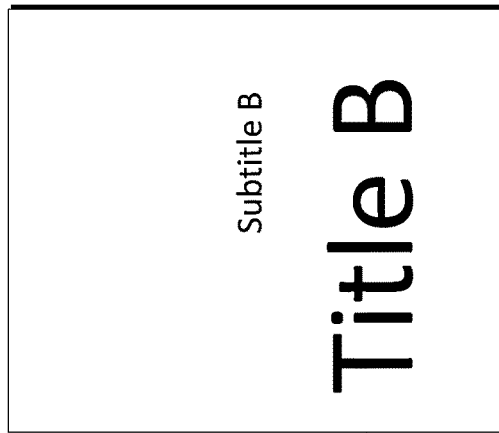
Figure 2B:
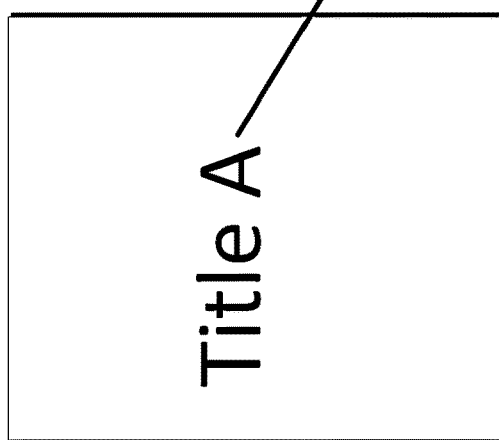

In another embodiment, as illustrated in the flow chart 202 in FIG. 2B, there is no correspondence between the number of text blocks in the user's input digital design and the selected template digital design. In that case, in response to the user's selection of the selected template digital design, the digital content creation/editing system applies the most similar design features of the selected template digital design to the user's input digital design in order to produce the retargeted input digital design. For example, as shown in FIG. 2B, the text size of "Title B" in the selected template digital design is most similar to the text size of "Title A" in the user's input digital design. Accordingly, the digital content creation/editing system applies design features from the text block including "Title B" (e.g., text size and placement) to the user's input digital design to achieve the retargeted input digital design.

Figure 2C:
Figure 2C:
Figure 2C:
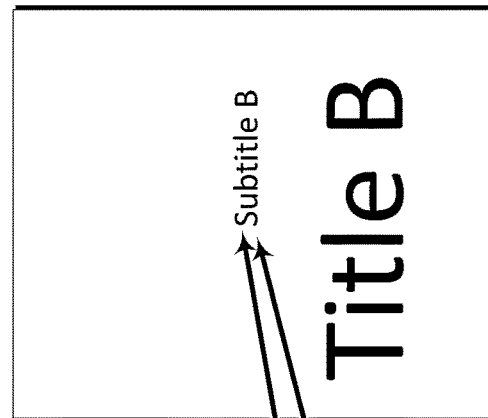
Figure 2C:
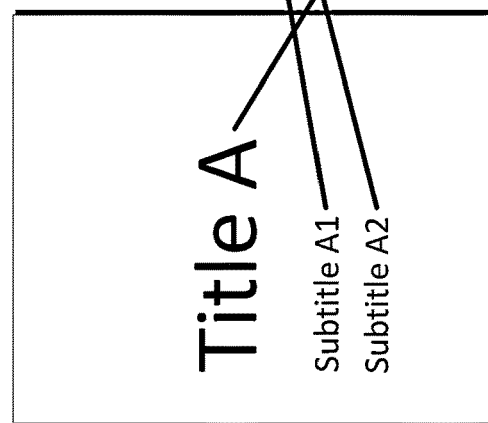
Figure 2D:
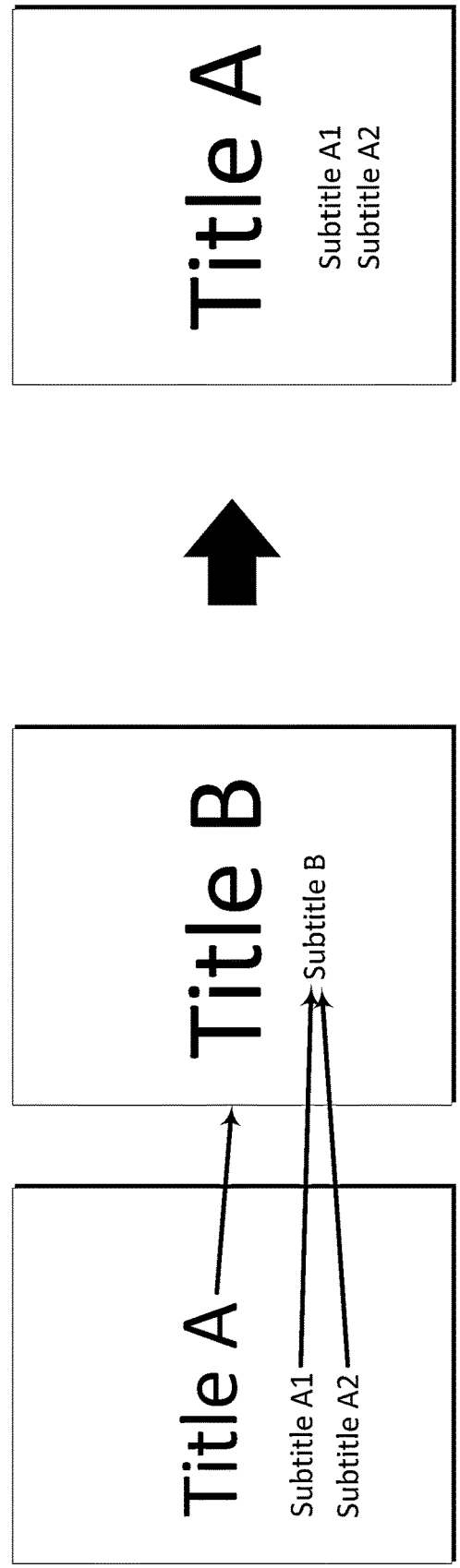
Figure 2E:
Figure 2E:
Figure 2E:
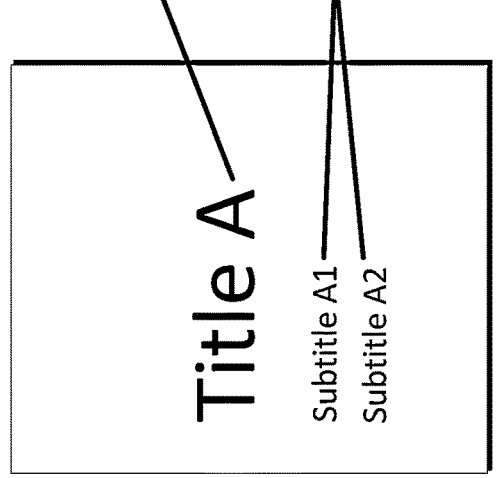

In yet another embodiment, as illustrated in the flow chart 204 in FIG. 2C, there is a many to one correspondence between the text blocks in the user's input digital design and the selected template digital design. In that case, in response to the user's selection of the selected template digital design, the digital content creation/editing system applies the design features across similar text blocks. For example, as shown in FIG. 2C, the digital content creation/editing system applies the placement and size of the text block including "Subtitle B" from the selected template digital design to each of the text blocks including "Subtitle A1" and "Subtitle A2" in the user's input digital design to achieve the placement and size of the text blocks including "Subtitle A1" and "Subtitle A2" in the retargeted input digital design. Similarly, the digital content creation/editing system applies the placement and size of the text block including "Title B" from the selected template digital design to the text block including "Title A" in the user's input digital design to achieve the placement and size of the text block including "Title A" in the retargeted input digital design. Additional many to one correspondence examples are illustrated in FIGS. 2D and 2E.

While the layout heuristics described above are described with reference to text blocks, the same heuristics can apply to overlays. For example, if a selected template digital design includes multiple overlays, each including text, the digital content creation/editing system can group overlays, un-group overlays, reposition overlays, etc. as needed in the input digital design in order to best approximate the look and feel of the selected template digital design. Furthermore, the digital content creation/editing system can change backing shapes, backing shape colors, text colors, text fonts, overlay borders, etc. as needed in the input digital design in order to best approximate the look and feel of the selected template digital design.

Figure 3B:
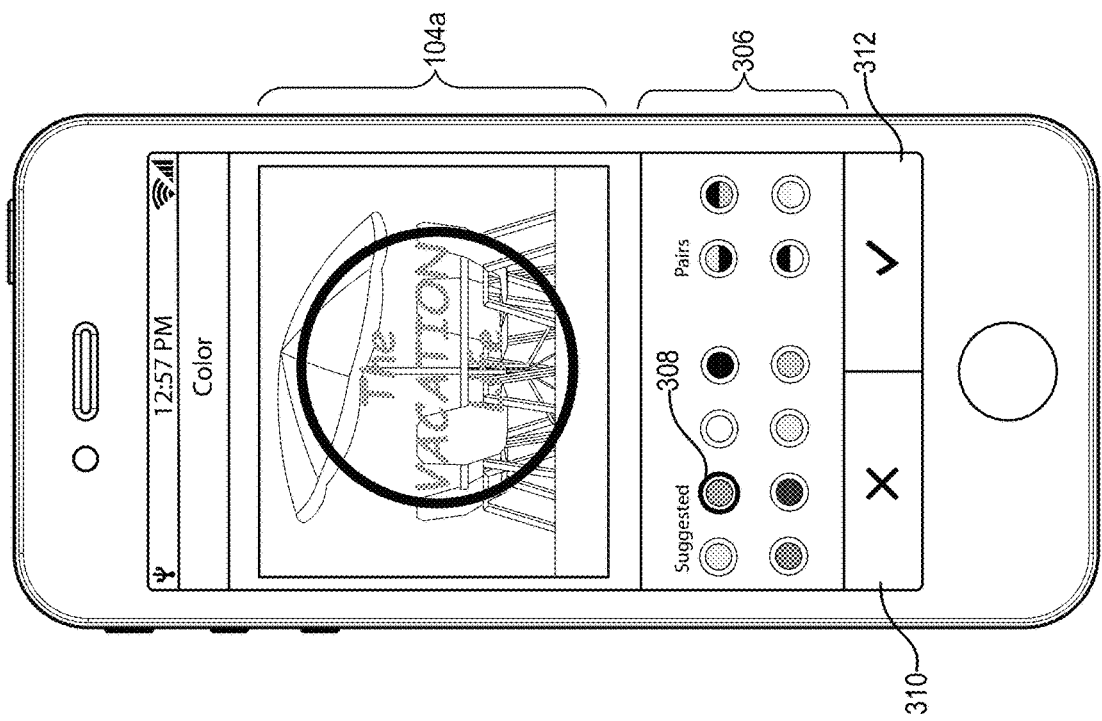
FIGS. 3A-3D illustrate another series of graphical user interfaces in connection with the digital content creation/editing system that allow for modification of input digital designs in accordance with one or more embodiments.
Figure 3A:
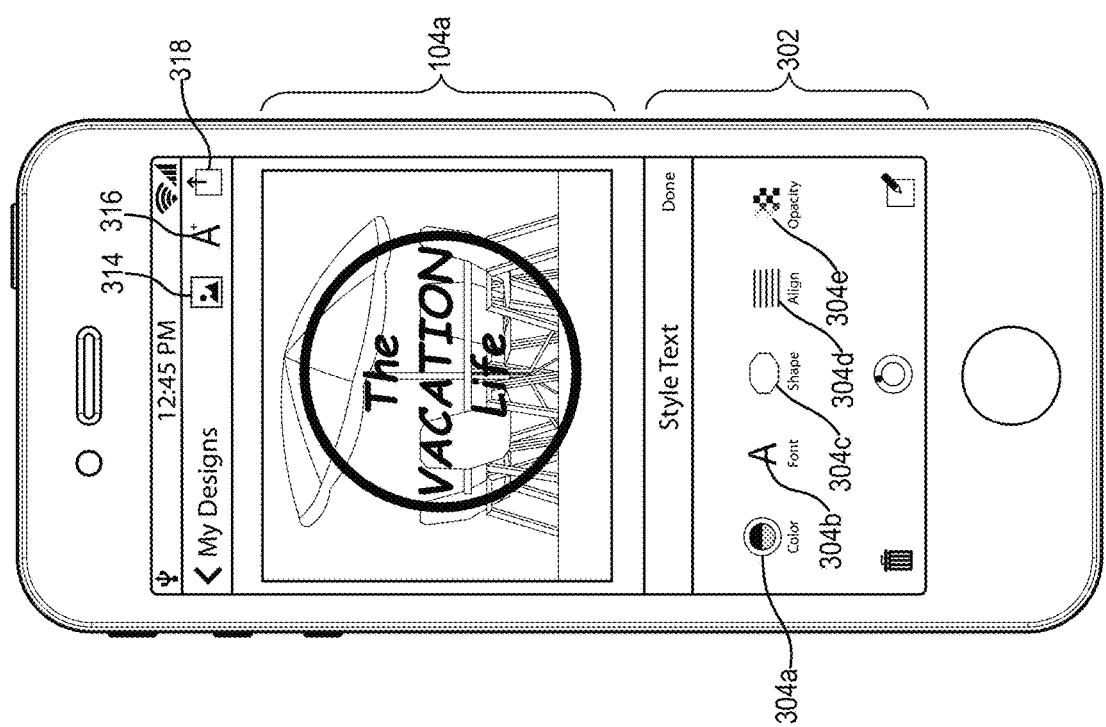

In additional or alternative embodiments, rather than mirroring the look and feel of a selected template digital design in a user's input digital design, the digital content creation/editing system enables additional controls that allow the user to manually edit the input digital design 104a. For example, the digital content creation/editing system provides the manual control palette 302, as shown in FIG. 3A. In one or more embodiments, the manual control palette 302 includes a color control 304a, a font control 304b, a backing shape control 304c, an alignment control 304d, and an opacity control 304e.

In response to selecting the color control 304a, as shown in FIG. 3A, the user can manually edit color within the input digital design 104a. In one or more embodiments, in response to the user selecting the color control 304a, the digital content creation/editing system can provide the color palette 306, as shown in FIG. 3B. For example, the color palette 306 includes various color options that the digital content creation/editing system applies to the input digital design 104a (e.g., the digital content creation/editing system may present all available colors within the color palette 306, or may only present colors that will likely be aesthetically pleasing within the input digital design 104a). In some embodiments, the digital content creation/editing system applies a selected color 308 to only the text within the input digital design 104a. In other embodiments, the digital content creation/editing system applies the selected color 308 to a portion of the input digital design 104a indicated by the user. In at least one embodiment, in response to the user tapping the selected color 308, the digital content creation/editing system provides previews of the selected color 308 in association with the input digital design 104a. If the user wants to return to the manual control palette 302 without saving any changes to the input digital design 104a, as shown in FIG. 3A, the use can select the exit control 310. If the user wants to save a change to the input digital design 104a, the user can select the save control 312.

Figure 3D:
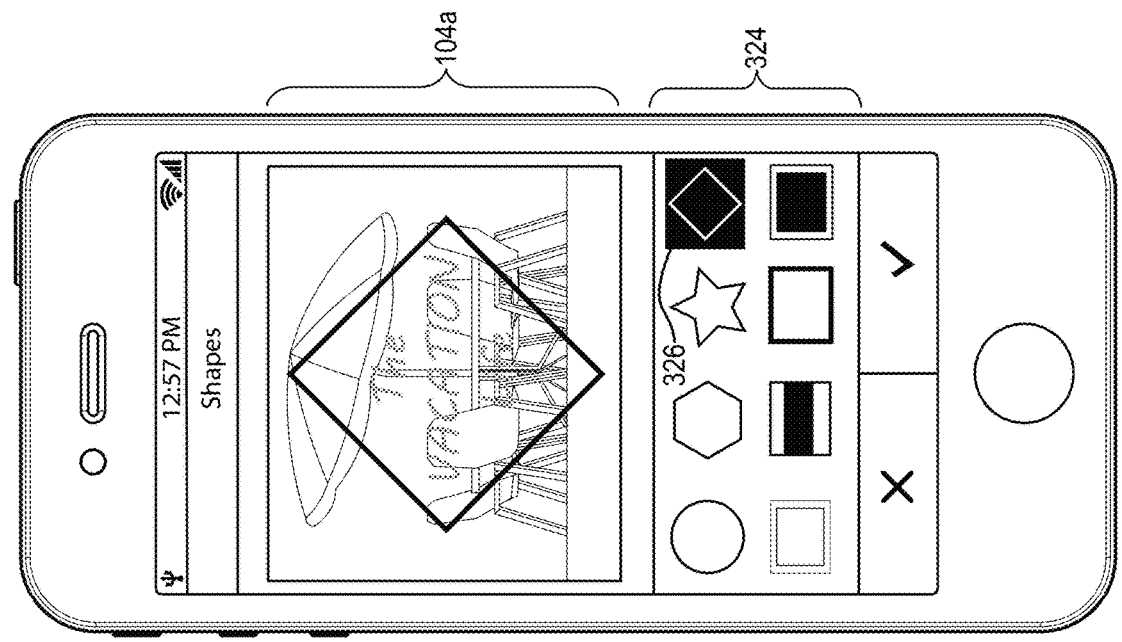
Figure 3C:
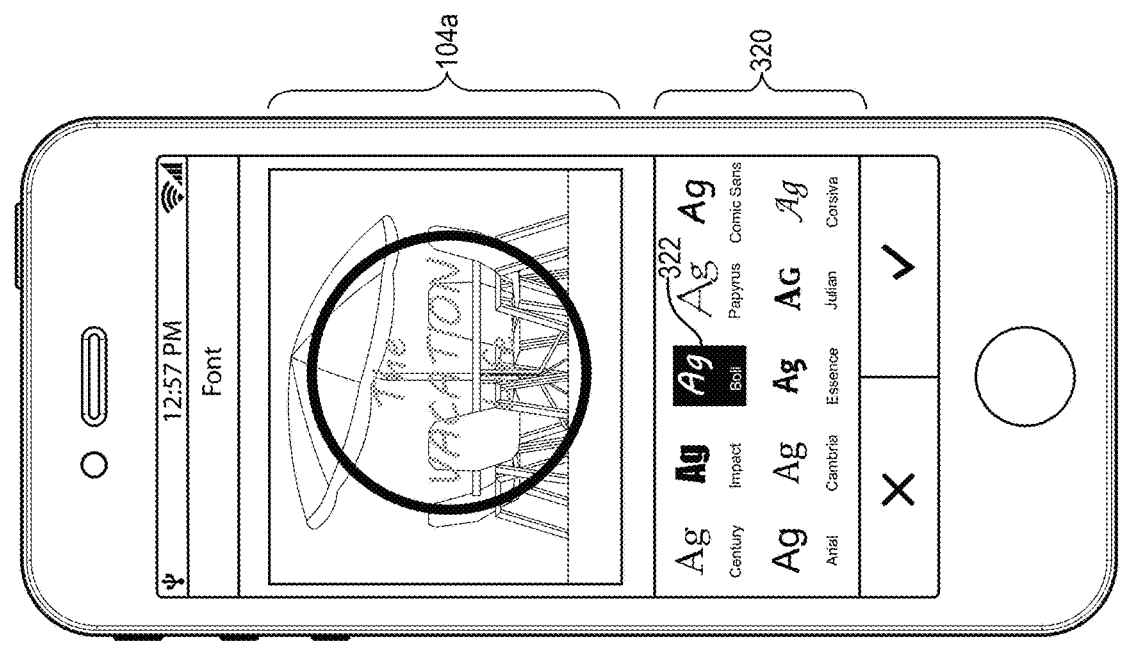

In order to manually edit the fonts shown in the input digital design 104a, the user can select the font control 304b, as shown in FIG. 3A. For example, in response to the user selecting the font control 304b, as shown in FIG. 3A, the digital content creation/editing system provides the font palette 320, as shown in FIG. 3C. In one or more embodiments, the font palette 320 includes various fonts available for application to the input digital design 104a. In response to the user tapping the selected font 322, the digital content creation/editing system applies the selected font 322 to the input digital design 104a.

In order to manually change the backing shape shown in the input digital design 104a, the user can select the backing control 304c, as shown in FIG. 3A. In response to the user selecting the backing control 304c, as shown in FIG. 3A, the digital content creation/editing system can provide the backing shape palette 324, as shown in FIG. 3D. In one or more embodiments, the backing shape palette 324 includes a variety of backing shape elements that the user can select. In response to the user selecting the backing shape 326, the digital content creation/editing system can apply the shape illustrated by the backing shape 326 to the input digital design 104a. In one or more embodiments, the digital content creation/editing system can automatically alter various design features or characteristics of the displayed text within the input digital design 104a in order for the displayed text to function cohesively with the selected backing shape. For example, in order to apply the shape illustrated by the backing shape element 326 to the input digital design 104a, the digital content creation/editing system can alter the size, font, color, placement, and opacity of the text within the input digital design 104a, such that the text is viewable against the selected backing shape.

Furthermore, the user can manually alter the alignment of the text within the input digital design 104a. In one or more embodiments, in response to the user selecting the alignment control 304d, as shown in FIG. 3A, the digital content creation/editing system can alter the alignment of the text displayed in the input digital design 104a. For example, the digital content creation/editing system can cause the alignment of the text to become center-aligned, right-justified, left-justified, etc. In at least one embodiment, the digital content creation/editing system can cycle through different text alignments in response to the user repeatedly selecting the alignment control 114d.

Additionally, the user can manually alter the opacity of the text, or other selected elements, within the input digital design 104a. In one or more embodiments, in response to the user selecting the opacity control 304e, as shown in FIG. 3A, the digital content creation/editing system can change the opacity of one or more elements within the input digital design 104a. For example, the digital content creation/editing system can change the opacity of the text within the input digital design 104a to become more or less opaque. In at least one embodiment, the digital content creation/editing system can cycle through various levels of opacity in response to the user repeatedly selecting the opacity control 114e. Alternatively, the digital content creation/editing system can provide a slider control in order for the user to select an opacity level in relation to the input digital design 104a.

The user can further manually edit various aspects of the background portion or the textual portion of the input digital design 104a by selecting the underlying image editing control 314 or the overlay editing control 316, as shown in FIG. 3A. Once the user is satisfied with the look and feel of the input digital design 104a, the user can share and/or store the input digital design 104a. In one or more embodiments, in response to the user selecting the sharing control 318, as shown in FIG. 3A, the digital content creation/editing system can provide various sharing options. By utilizing the various controls provided, the user can upload the input digital design 104a to various social media channels, save the input digital design 104a locally or remotely, print the input digital design 104a, etc. In at least one embodiment, the digital content creation/editing system can automatically save the input digital design 104a at regular intervals in order to save the user from accidentally loosing edits.

One will appreciate in light of the disclosure herein that after a user makes one or more manual changes to a input digital design, the digital content creation/editing system can re-calculate compatibility scores between the modified input digital design and the plurality of template digital designs. Thus, the digital content creation/editing system can allow the user to perform an iterative design process in which new template digital designs are presented based on manual changes made to a design or retargeting of design features of a template digital design to the input digital design.

Figure 4:
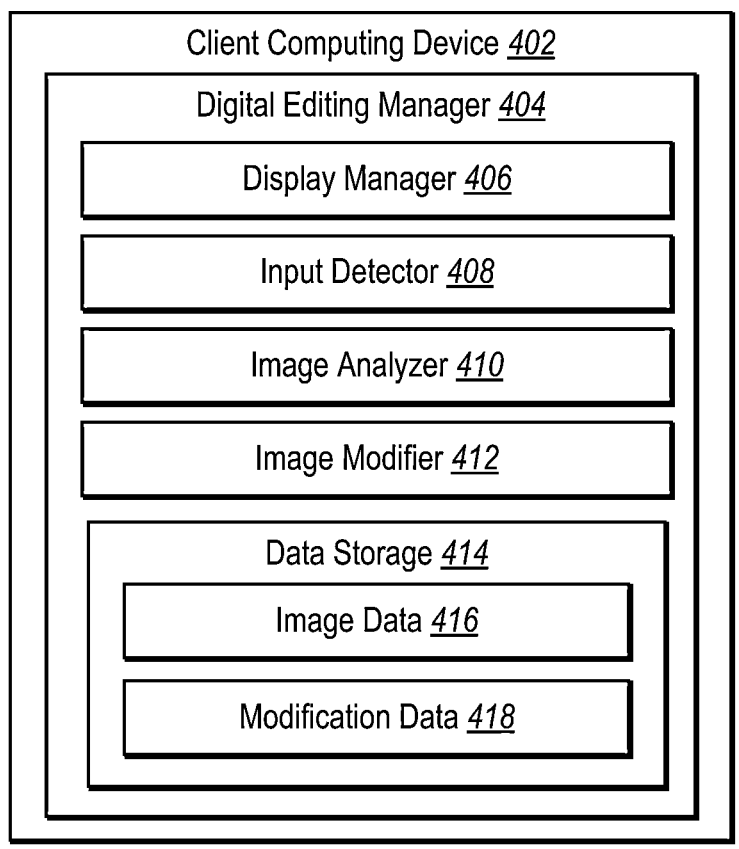
FIG. 4 illustrates a schematic diagram of the digital content creation/editing system in accordance with one or more embodiments.

FIGS. 1A-3D and their related descriptions detail the functions and design features of the digital content creation/editing system with regard to a series of user interfaces with which a user can interact. FIG. 4 illustrates an example architecture for the digital content creation/editing system. For example, as shown in FIG. 4, the digital content creation/editing system includes a digital editing manager 404 installed on a client-computing device 402. In one or more embodiments, the digital editing manager 404 is a native application installed on the client-computing device 402. For instance, the digital editing manager 404 may be a mobile application that installs and runs on a client device with a touch screen, such as a smart phone or a tablet. Alternatively, the digital content creation/editing system can run on a non-touch screen enabled device.

Thus, the client-computing device 402 can be any type of computing device (e.g., a desktop or laptop), but is preferably a handheld device such as a smart phone, a tablet, a personal digital assistant, a smart wearable (e.g., a smart watch or enhanced eyewear), etc. In additional or alternative embodiments, the digital editing manager 404 is a desktop application, widget, or other form of a native computer program. Alternatively, the digital editing manager 404 may be a remote application accessed by the client-computing device 402 over a network, or may be a web application that is executed with a web browser of the client-computing device 402.

As shown in FIG. 4, the digital editing manager 404 includes, but is not limited to, a display manager 406, an input detector 408, an image analyzer 410, an image modifier 412, and a data storage 414. In one or more embodiments, the components 404-414 comprise software, hardware, or both. For example, the components 404-414 can comprise computing instructions stored on a non-transitory computer-readable storage medium and executable by at least one processor of the client-computing device 402. When executed by the at least one processor, the computing-executable instructions cause the client-computing device 402 to perform the methods and processes described herein. Alternatively, the components 404-414 can comprise hardware, such as a special purpose processing device to perform a certain function or group of functions. Additionally or alternatively, the components 404-414 can comprise a combination of computer-executable instructions and hardware.

As mentioned above, and as shown in FIG. 4, the digital editing manager 404 includes a display manager 406. The display manager 406 provides, manages, and/or controls a graphical user interface (or simply "user interface") that allows a user to edit digital images. For example, the display manager 406 provides a user interface that facilitates interactions with a display. Likewise, the display manager 406 provides a user interface that displays information provided by other components 408-414 of the digital editing manager 404.

More specifically, the display manager 406 facilitates the display of a user interface (e.g., by way of a display device associated with the client-computing device 402). For example, the user interface is composed of a plurality of graphical components, objects, and/or elements that allow a user to interact with the digital editing manager 404. More particularly, the display manager 406 directs the client-computing device 402 to display a group of graphical components, objects, and/or elements as directed by the digital editing manager 404.

As further illustrated in FIG. 4, the digital editing manager 404 includes an input detector 408. In one or more embodiments, the input detector 408 detects, receives, and/or facilitates user input in any suitable manner. In some examples, the input detector 408 detects one or more user interactions with respect to the user interface. As referred to herein, a "user interaction" means a single interaction, or combination of interactions, received from a user by way of one or more input devices.

For example, the input detector 406 detects a user interaction from a keyboard, mouse, touch pad, touch screen, and/or any other input device. In the event the client-computing device 402 includes a touch screen, the input detector 408 detects one or more touch gestures (e.g., swipe gestures, tap gestures, pinch gestures, or reverse pinch gestures, etc.) from a user that forms a user interaction. In some examples, a user provides the touch gestures in relation to and/or directed at one or more graphical objects or graphical elements of a user interface.

The input detector 408 may additionally, or alternatively, receive data representative of a user interaction. For example, the input detector 408 receives one or more user configurable parameters from a user, one or more user commands from the user, and/or any other suitable user input. The input detector 408 may also receive input data from one or more components of the digital editing manager 404.

The digital editing manager 404 performs one or more functions in response to the input detector 408 detecting user input and/or receiving other data. Generally, a user can control, navigate, and otherwise use the digital editing manager 404 by providing one or more user inputs that the input detector 408 can detect. For example, in response to the input detector 408 detecting user input, the display manager 406 allows the user to view data, interact with various controls, or edit digital images. In addition, in response to the input detector 408 detecting user input, the display manager 406 allows a user to navigate through one or more user interfaces to view, edit, save, and share a digital image. For example, a user may provide input (e.g., via a button click, a list item selection, a drag-and-drop, etc.) indicating an edit to a digital image. In response to the input detector 308 detecting the input, the digital editing manager 404 takes appropriate action in response to the detected user input.

As shown in FIG. 4, the digital editing manager 404 also includes an image analyzer 410. As discussed above, in order to select template digital designs that are compatible with an input digital design, the digital content creation/editing system identifies various design features associated with the input digital design. The digital content creation/editing system also identifies various design features associated with each available template digital design. Accordingly, in one or more embodiments, the image analyzer 410 analyzes the input digital design to identify various design features of the input digital design. For example, the image analyzer 410 analyzes the input digital design to identify design features including, but not limited to, the number of overlays, number of text blocks, text size, relative position of text blocks, overlay placement, color palettes associated with the underlying image of the input digital design, color palettes associated with the one or more overlays of the input digital design, backing shapes and/or borders associated with the one or more overlays of the input digital design, filters associated with the underlying image and/or overlay of the input digital design, empty spaces within the input digital design, shapes within the underlying images of the input digital design, metadata associated with the input digital design, etc.

Then, in response to the digital content creation/editing system performing the initial filter, the image analyzer 410 identifies selected design features of each available template digital design, as described above. For example, the image analyzer 410 identifies a number of text blocks, the text size associated with each text block, and the relative location of each text block in each available template digital design. With these initial design features identified, the image analyzer 410 compares correlating design features between each available template digital design and the input digital design to determine whether each available template digital design satisfies a base level of compatibility with the input digital design. If the image analyzer 410 determines that an available template digital design is within a threshold level of similarity with the input digital design based on the number of text blocks, the text size associated with each text block, and the relative location of each text block, the image analyzer 410 will pass the available template digital design through the filter. If the image analyzer 410 determines that an available template digital design is not within a threshold level of similarity with the input digital design, the image analyzer 410 will not pass the available template digital design through the filter and the available template digital design will be disregarded.

Later, in response to the digital content creation/editing system calculating a compatibility score for each template digital design that passes the initial filtering process, the image analyzer 410 further identifies additional design features of the filtered template digital designs. For example, in addition to the identified number of text blocks, text size, and relative text block location in each filtered template digital design, the digital content creation/editing system also identifies design features of the filtered template digital designs including, but not limited to, color palettes, backing shapes and/or borders, filters, empty space, metadata, etc. Accordingly, the image analyzer 410 identifies correlating design features between the input digital design and each of the filtered template digital designs.

In order to calculate a compatibility score for each filtered template digital design, the image analyzer 410 compares correlating design features between the input digital design and each of the filtered template digital designs for similarity. For example, the image analyzer 410 starts a compatibility score for a particular filtered template digital design at zero. If two corresponding design features between the filtered template digital design and the input digital design are very similar, the image analyzer 410 adds a larger value to the filtered template digital design's compatibility score. If two corresponding design features between the filtered template digital design and the input digital design are not very similar, the image analyzer 410 adds a smaller value to the filtered template digital design's compatibility score. If the filtered template digital design does not include a certain design feature that is present in the input digital design, the image analyzer 410 adds nothing to the filtered template digital design's compatibility score. The image analyzer 410 continues adding to the filtered template digital design's compatibility score for each identified design feature between the particular template digital design and the input digital design, until all identified design features have been accounted for. The image analyzer 410 continues this process for each filtered template digital design until all filtered template digital designs have a calculated compatibility score.

After calculating a compatibility score for each filtered template digital design, the image analyzer 410 proceeds to rank the filtered template digital designs based on their compatibility scores. In at least one embodiment, the image analyzer 410 ranks the filtered template digital designs from highest compatibility score to lowest compatibility score. Alternatively, the image analyzer 410 can rank the filtered template digital designs in other ways.

As mentioned above, and as illustrated in FIG. 4, the digital editing manager 404 also includes an image modifier 412. As discussed above, in response to the user selecting a scored ranked template digital design, the image modifier 412 applies one or more design features of the selected scored ranked template digital design to the user's input digital design. For example, in order to apply the various design features of the selected template digital design to the input digital design, the image modifier 412 modifies one or more design features of the input digital design to match the one or more corresponding design features of the selected template digital design.

Furthermore, the image modifier 412 determines whether a layout heuristic needs to be applied to the retargeted input digital design. As discussed above, the selected template digital design may include design features that are not an exact match for the corresponding design features in the input digital design. Accordingly, in one or more embodiments, the image modifier 412 utilizes various layout heuristics to handle scenarios where the there is no exact match in text block layouts between the input digital design and a selected template digital design such that text legibility, relative text size, and text location are maintained. As described above, the image modifier 412 groups blocks of text, un-groups blocks of text, repositions blocks of text, etc., as needed in the input digital design in order to best approximate the look and feel of the selected template digital design.

Also as mentioned above, and as illustrated in FIG. 4, the digital editing manager 404 includes a data storage 414. The data storage 414 can store and maintain image data 416 and modification data 418. In one or more embodiments, the image data 416 is representative of image information, such as described herein. Also, in one or more embodiments, the modification data 418 is representative of modification information, such as described herein.

Figure 5:
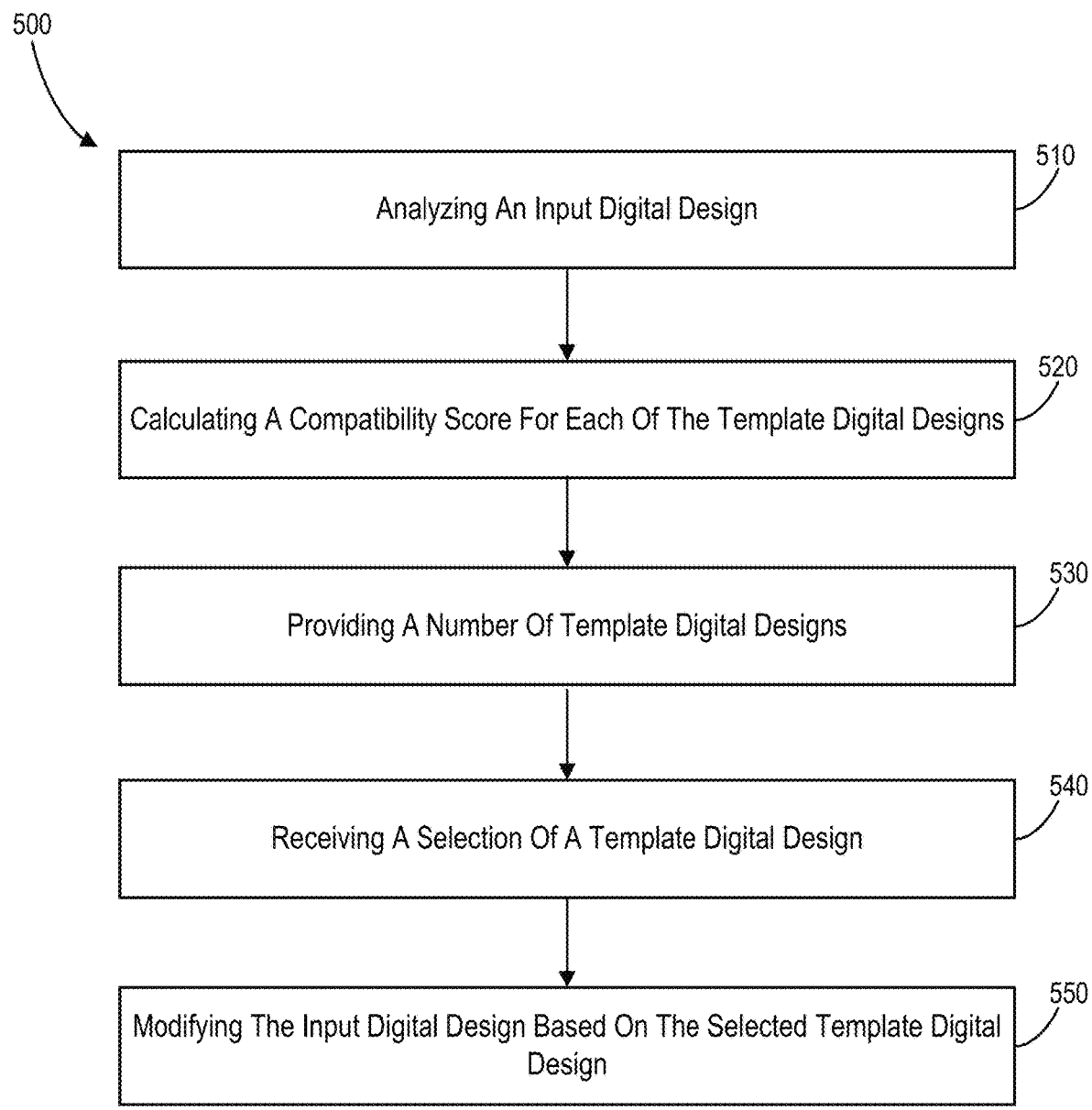
FIG. 5 illustrates a flowchart of a series of acts in a method of applying features of a selected template digital design to an input digital design in accordance with one or more embodiments.

FIGS. 1A-4, the corresponding text, and the examples provide a number of different methods, systems, and devices for procedurally generating sets of probabilistically distributed styling values and styling combinations. In addition to the foregoing, embodiments can also be described in terms of flowcharts comprising acts and steps in a method for accomplishing a particular result. For example, FIG. 5 illustrates a flowchart illustrating acts and steps in a method of applying design features of a selected template digital design to an input digital design. One will appreciate in light of the disclosure herein that the method may be performed with less or more steps/acts or the steps/acts may be performed in differing orders. Additionally, the steps/acts described herein may be repeated or performed in parallel with one another or in parallel with different instances of the same or similar steps/acts.

FIG. 5 illustrates a flowchart of one example method 500 of applying design features of a selected template digital design to an input digital design. The method 500 includes an act 510 of analyzing an input digital design. In particular, the act 510 involves analyzing an input digital design (e.g., the editable digital design 104*a* as shown in FIGS. 1B—1E) to identify design features in the input digital design.

The method 500 also includes an act of filtering a plurality of template digital designs (e.g., the template digital designs 118*a*, 118*b*, and 118*c* as shown in FIGS. 1C-1E) to identify template digital designs design features corresponding to one or more of the design features of the input digital design, wherein the set of template digital designs comprises identified digital designs including one or more of the design features of the input digital design. For example, filtering the plurality of template digital designs includes identifying design features of each of the plurality of template design templates. In at least one embodiment, identifying design features of the input digital design and each of the plurality of template digital designs comprises identifying one or more of a number of text blocks, text block sizes, or relative locations of text blocks. Furthermore, filtering a plurality of template digital designs to identify template digital designs including one or more of the design features of the input digital design includes determining whether a base level of compatibility exists between the design features of the input digital design and the design features of each of the plurality of template digital designs.

The method 500 also includes an act 520 of calculating a compatibility score for each of the template digital designs. In particular, the act 520 involves calculating, for each template digital design in a set of template digital designs, a compatibility score indicating a compatibility with the input digital design based on the identified design features in the input digital design. In at least one embodiment, the set of template digital designs includes only filtered template digital designs. Additionally, in at least one embodiment, the method 500 further includes ranking the number of the template digital designs with high compatibility scores for potential retargeting of the input digital design based on each of the one or more template digital design's calculated compatibility score.

The method 500 further includes an act 530 of providing a number of template digital designs. In particular, the act 530 involves providing a number of the template digital designs with high compatibility scores for potential retargeting of the input digital design. In at least one embodiment, providing a number of the template digital designs with high compatibility scores for potential retargeting of the input digital design includes providing the template digital design via a user interface control (e.g., the template digital design selection control 116 as shown in FIGS. 1C-1E).

Additionally, the method 500 includes an act 540 of receiving a selection of a template digital design. In particular, the act 540 involves receiving a selection of one of the provided template digital designs. In at least one embodiment, receiving a selection of one of the provided template digital designs is via the user interface control (e.g., the template digital design selection control 116 as shown in FIGS. 1C-1E).

Furthermore, the method 500 includes an act 550 of modifying the input digital design based on the selected template digital design. In particular, the act 550 involves modifying one or more design features of the input digital design to correspond with one or more design features of the selected template digital design. For example, modifying one or more design features of the input digital design to correspond with one or more design features of the selected template digital design includes changing a font, a size, and a location of a text block in the input digital design to match a font, a size, and a location of a text block in the selected template digital design. Alternatively, modifying one or more design features of the input digital design to correspond with one or more design features of the selected template digital design includes changing a color of a font of a text block in the input digital design to match a color of a font of a text block in the selected template digital design. In that case, modifying one or more design features of the input digital design to correspond with one or more design features of the selected template digital design further includes adding an overlay from the selected template digital design about the text block in the input digital design.

Figure 6:
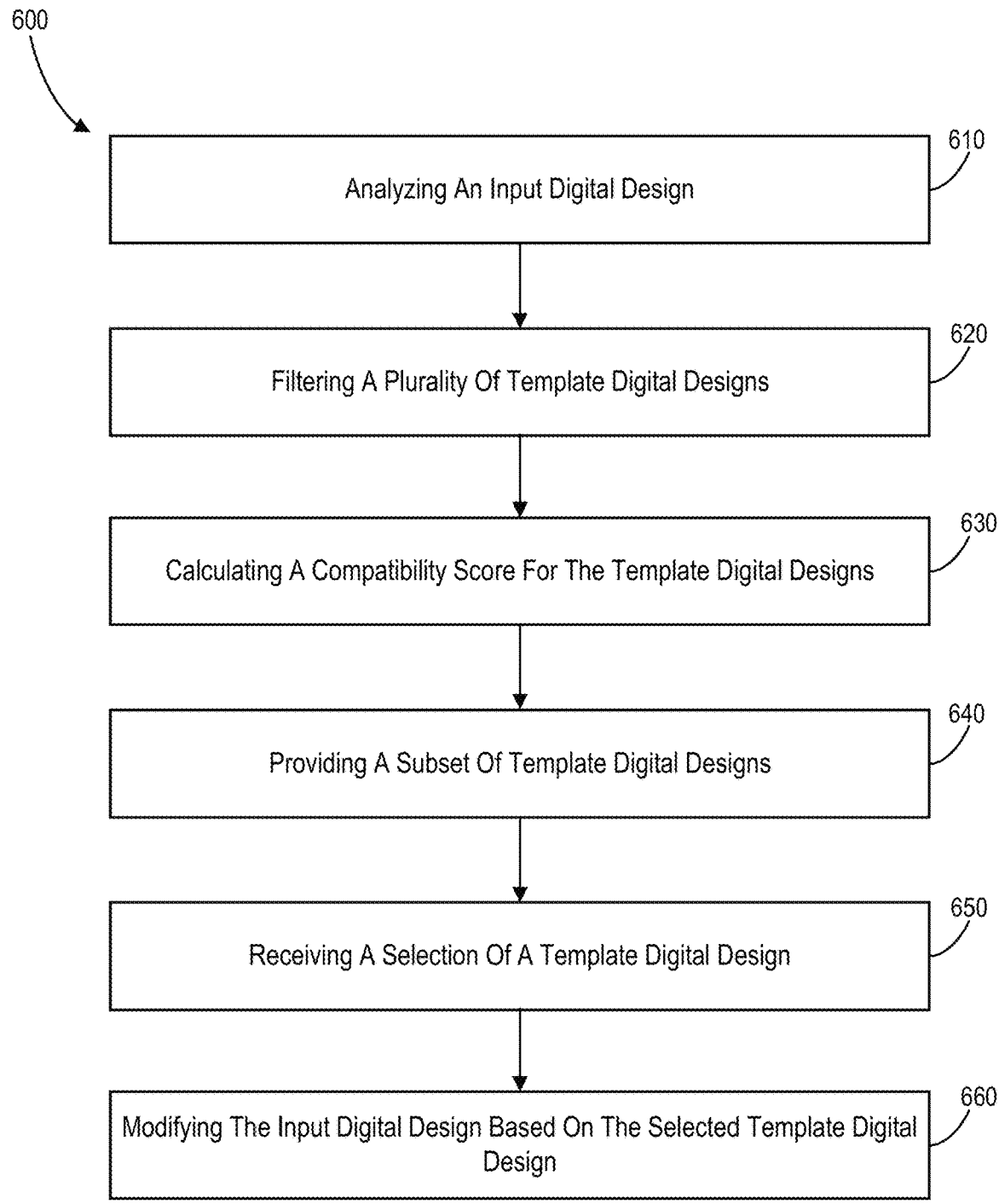
FIG. 6 illustrates another flowchart of a series of acts in a method of retargeting an input digital design based on a selected template digital design in accordance with one or more embodiments.

FIG. 6 illustrates a flowchart of another example method 600 of retargeting an input digital design based on a selected template digital design. The method 600 includes an act 610 of analyzing an input digital design. In particular, the act 610 involves analyzing an input digital design (e.g., the editable digital design 104a as shown in FIGS. 1B-1E) to identify design features in the input digital design.

The method 600 also includes an act 620 of filtering a plurality of template digital design. In particular, the act 620 involves filtering a plurality of template digital designs (e.g., the template digital designs 118a, 118b, and 118c as shown in FIGS. 1C-1E) based on a limited set of design features of the input digital design to identify a set of compatible template digital designs. In at least one embodiment, the limited set of design features comprise a number of text blocks and a length of the text blocks in the input digital design.

The method 600 also includes an act 630 of calculating a compatibility score for the template digital designs. In particular, the act 630 involves calculating, for each template digital design in the set of compatible template digital designs, a compatibility score based on an expanded set of design features of the input digital design. For example, the expanded set of design features comprises three or more of text groupings, fonts, text heights, backing shapes, background colors, background shapes, empty spaces, and underlying images. In one or more embodiments, calculating, for each template digital design in the set of compatible template digital designs, a compatibility score based on an expanded set of design features of the input digital design includes determining a readability of one or more text blocks from the input digital design if provided with design features of a text block from a given template digital design.

The method 600 includes an act 640 of providing a subset of template digital designs. In particular, the act 640 involves providing a subset of template digital designs having high compatibility scores for potential retargeting of the input digital design. For example, providing a subset of template digital designs having high compatibility scores for potential retargeting of the input digital design includes providing a predetermined number of template digital designs in a ranked order based on compatibility score on a touch screen of a mobile client device.

The method 600 also includes an act of comparing the design features of the input digital design with design features of the selected template digital design. The method 600 further includes acts of determining a one-to-one correspondence between a first design element of the input digital design and a second design element of the selected template digital design, and based on the determined one-to-one correspondence providing the first design element of the input digital design with the design features of the second design element of the selected template digital design. For example, in at least one embodiment, the first design element comprises a first text block, the second design element comprises a second text block, and providing the first design element of the input digital design with the design features of the second design element of the selected template digital design comprises changing a font, a color, a size, and a relative location of the first text block to match a font, a color, a size, and a relative location of the second text block.

The method 600 further includes an act 650 of receiving a selection of a template digital design. In particular, the act 650 involves receiving a selection of one of the provided template digital designs. In at least one embodiment, receiving a selection of one of the provided template digital designs is via a user interface control (e.g., the template digital design selection control 116 as shown in FIGS. 1C-1E).

Additionally, the method 600 includes an act 660 of modifying the input digital design based on the selected template digital design. In particular, the act 660 involves modifying one or more design features of the input digital design to correspond with one or more design features of the selected template digital design. In at least one embodiment, modifying one or more design features of the input digital design to correspond with one or more design features of the selected template digital design includes applying an image filter applied to an underlying image of the selected template digital design to an underlying image of the input digital design.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
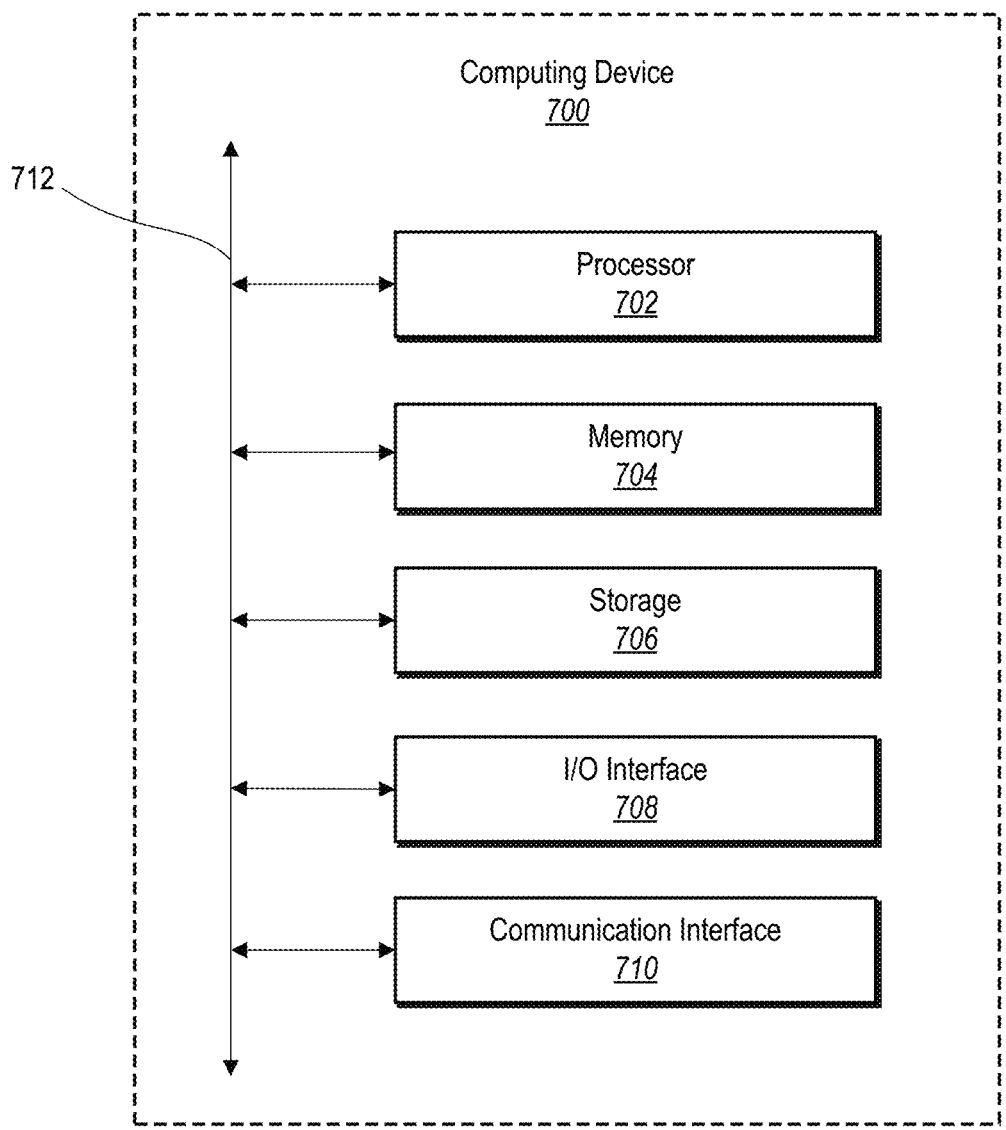
FIG. 7 illustrates a block diagram of an exemplary computing device in accordance with one or more embodiments.

FIG. 7 illustrates a block diagram of an exemplary computing device 700 that may be configured to perform one or more of the processes described above. One will appreciate that one or more computing devices such as the computing device 700 may implement the digital content creation/editing system. As shown by FIG. 7, the computing device 700 can comprise a processor 702, memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In particular embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In particular embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, the storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In particular embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from the computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications via various communication protocols. Examples of communication protocols that may be used include, but are not limited to, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML"), JavaScript Object Notation ("JSON"), and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 8:
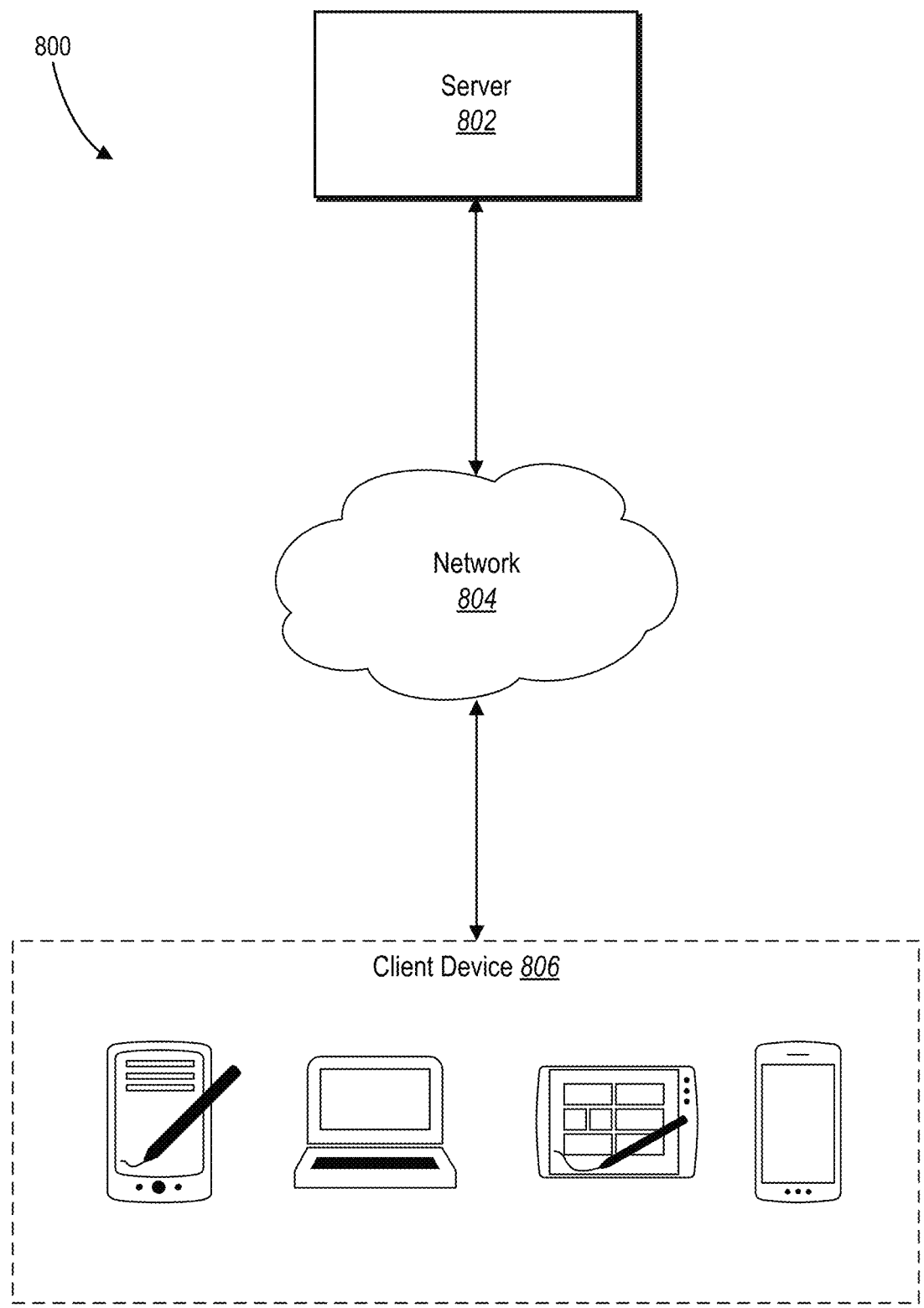
FIG. 8 is an example network environment in which the digital content creation/editing system can operate in accordance with one or more embodiments.

FIG. 8 illustrates an example network environment 800 of in which a server can operate. The network environment 800 includes a client system 806, and a server 802 connected to each other by a network 804. Although FIG. 8 illustrates a particular arrangement of the client system 806, the server 802, and the network 804, this disclosure contemplate digital designs any suitable arrangement of the client system 806, the server 802, and the network 804. As an example and not by way of limitation, the client system 806 and the server 802 may be connected to each other directly, bypassing network 804. As another example, the client system 806 and the server 802 may be physically or logically co-located with each other in whole or in part. Moreover, although FIG. 8 illustrates a particular number of client systems 806, servers 802, and networks 804, this disclosure contemplate digital designs any suitable number of client systems 806, servers 802, and networks 804. As an example and not by way of limitation, network environment 800 may include multiple client system 806, servers 802, and networks 804.

This disclosure contemplate digital designs any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client system 806 and the server 802 to the communication network 804 or to each other. This disclosure contemplate digital designs any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplate digital designs any suitable client systems 806. A client system 806 may enable a network user at client system 806 to access network 804. A client system 806 may enable its user to communicate with other users at other client systems 806.

In particular embodiments, client system 806 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplate digital designs any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 802 may be capable of linking a variety of entities. As an example and not by way of limitation, server 802 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating the server 802. In particular embodiments, however, the server 802 and third-party systems may operate in conjunction with each other to provide digital media services to users of the server 802 or third-party systems. In this sense, server 802 may provide a platform, or backbone, which other systems, such as third-party systems, may use to provide digital media services and functionality to users across the Internet.

In particular embodiments, a third-party system may include a third-party content object provider. A third-party content object provider may include one or more sources of content objects, which may be communicated to a client system 806. As an example and not by way of limitation, content objects may include information regarding things or activities of interest to the user, such as, for example, digital media, input digital designs, digital photographs, digital videos, digital audio, clip art, fonts, etc. As another example and not by way of limitation, content objects may include metadata that describes the content objects.

In particular embodiments, server 802 may include a variety of servers, sub-systems, programs, modules, logs, and data stores. In particular embodiments, server 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server 802 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
analyzing an input digital design comprising an underlying image and an overlay;
providing a number of existing digital designs for potential retargeting of the input digital design, each of the existing digital designs comprising a respective underlying image and a respective overlay;
receiving a selection of one of the existing digital designs; and
modifying one or more design features of the underlying image of the input digital design to match one or more design features of a respective underlying image of the selected existing digital design.

2. The method as recited in claim 1, wherein modifying the one or more design features of the underlying image of the input digital design to match the one or more design features of the respective underlying image of the selected existing digital design comprises applying an image filter applied to the respective underlying image of the selected existing digital design to the underlying image of the input digital design.

3. The method as recited in claim 1, wherein modifying the one or more design features of the underlying image of the input digital design to match the one or more design features of the respective underlying image of the selected existing digital design comprises modifying a color palette of the underlying image of the input digital design to match a color palette of the respective underlying image of the selected existing digital design.

4. The method as recited in claim 1, wherein modifying the one or more design features of the underlying image of the input digital design to match the one or more design features of the respective underlying image of the selected existing digital design comprises modifying a tone of the underlying image of the input digital design to match a tone of the respective underlying image of the selected existing digital design.

5. The method as recited in claim 1, wherein analyzing the input digital design comprises identifying:
text content of the overlay;
design features of the overlay, the design features of the overlay comprising a text font, a text size, and a text position; and
the one or more design features of the underlying image of the input digital design.

6. The method as recited in claim 5, further comprising determining, for existing digital designs in a set of existing digital designs, a compatibility score indicating a compatibility with the input digital design based on the identified design features of the overlay of the input digital design.

7. The method as recited in claim 6, wherein providing the number of existing digital designs for potential retargeting of the input digital design comprises filtering the number of existing digital designs from the set of existing digital designs based the number of existing digital designs having high compatibility scores with the input digital design.

8. The method as recited in claim 1, further comprising modifying one or more of a text font, a text size, or a text position of text of the overlay of the input digital design to match text a respective overlay of the selected existing digital design.

9. A non-transitory computer readable medium storing executable instructions which, when executed by a processing device, cause the processing device to perform operations comprising:
analyzing an input digital design comprising an underlying image and an overlay;
providing a number of existing digital designs for potential retargeting of the input digital design, each of the existing digital designs comprising a respective underlying image and a respective overlay;
receiving a selection of one of the existing digital designs; and
modifying one or more design features of the underlying image of the input digital design to match one or more design features of a respective underlying image of the selected existing digital design.

10. The non-transitory computer readable medium as recited in claim 9, wherein the operations comprise determining, for existing digital designs in a set of existing digital designs, a compatibility score indicating a compatibility with the input digital design based on a set of design features of the input digital design.

11. The non-transitory computer readable medium as recited in claim 10, wherein determining the compatibility score comprises:
identifying a length of text of the overlay of the input digital design;
identifying a length of a text of each of the existing digital designs in the set of existing digital designs; and
calculating the compatibility score based on a similarly between the length of the text of the overlay of the input digital design and the identified length of the text of each of the existing digital designs.

12. The non-transitory computer readable medium as recited in claim 9, wherein the operations further comprise:

determining a correspondence between a first element of the overlay of the input digital design and a first element of the selected existing digital design; and based on the determined correspondence, provide the first element of the overlay of the input digital design with one or more design features of the first element of the selected existing digital design.

13. The non-transitory computer readable medium as recited in claim 12, wherein:

the first element of the overlay of the input digital design comprises an existing first text block comprising text content, the first element of the selected existing digital design comprises a second text block, and providing the first element of the overlay of the input digital design with one or more design features of the first element of the selected existing digital design comprises changing one or more of a text font, a text color, a text size, or a text position of the existing first text block to match one or more of a text font, a text color, a text size, or a text position of the second text block, without changing the text content in the existing first text block.

14. The non-transitory computer readable medium as recited in claim 9, wherein modifying the one or more design features of the underlying image of the input digital design to match the one or more design features of the respective underlying image of the selected existing digital design comprises one or more of modifying a color palette, modifying a tone, or applying a filter to the underlying image of the input digital design to match a color palette, a tone, or a filter of the respective underlying image of the selected existing digital design.

15. A system comprising:

one or more memory devices; and one or more processors configured to cause the system to perform operations comprising:

analyzing an input digital design comprising an underlying image and an overlay to identify design features of the input digital design;

filtering a plurality of existing digital designs based on a limited set of the design features of the input digital design to identify a set of compatible existing digital designs, each of the existing digital designs comprising a respective underlying image and a respective overlay;

providing the set of compatible existing digital designs for potential retargeting of the input digital design;

receiving a selection of an existing digital design of the set of compatible existing digital designs; and modifying one or more design features of the input digital design to match one or more design features of the selected existing digital design.

16. The system as recited in claim 15, wherein modifying the one or more design features of the input digital design to match the one or more design features of the selected existing digital design comprises modifying a design feature of the underlying image of the input digital design to match a design feature of a respective underlying image of the selected existing digital design.

17. The system as recited in claim 16, wherein modifying the design feature of the underlying image of the input digital design to match the design feature of the respective underlying image of the selected existing digital design comprises one or more of modifying a color palette, modifying a tone, or applying a filter to the underlying image of the input digital design to match a color palette, a tone, or a filter of the respective underlying image of the selected existing digital design.

18. The system as recited in claim 15, wherein modifying the one or more design features of the input digital design to match the one or more design features of the selected existing digital design comprises changing a font, a size, or a location of a text block in the input digital design to match a font, a size, or a location of a text block in the selected existing digital design.

19. The system as recited in claim 15, wherein modifying the one or more design features of the input digital design to match the one or more design features of the selected existing digital design comprises changing a color of a font of a text block in the input digital design to match a color of a font of a text block in the selected existing digital design.

20. The system as recited in claim 15, wherein modifying the one or more design features of the input digital design to match the one or more design features of the selected existing digital design comprises adding an overlay from the selected existing digital design about text in the input digital design.

* * * * *